(12) United States Patent
Scholtz et al.

(10) Patent No.: US 10,859,437 B2
(45) Date of Patent: Dec. 8, 2020

(54) INTEGRATION OF OPTICAL COMPONENTS WITHIN A FOLDED OPTICAL PATH

(71) Applicant: Chromation, Inc., New York, NY (US)

(72) Inventors: James Scholtz, Jamesport, NY (US); Nadia Pervez, Houston, TX (US); Ioannis Kymissis, New York, NY (US); Michael Gazes, Forest Hills, NY (US)

(73) Assignee: CHROMATION, INC., Bronx, NY (US)

( * ) Notice: Subject to any disclaimer, the term of this patent is extended or adjusted under 35 U.S.C. 154(b) by 105 days.

(21) Appl. No.: 16/303,373

(22) PCT Filed: May 10, 2017

(86) PCT No.: PCT/US2017/032005
§ 371 (c)(1),
(2) Date: Nov. 20, 2018

(87) PCT Pub. No.: WO2017/197013
PCT Pub. Date: Nov. 16, 2017

(65) Prior Publication Data
US 2019/0353522 A1  Nov. 21, 2019

Related U.S. Application Data

(60) Provisional application No. 62/334,050, filed on May 10, 2016.

(51) Int. Cl.
*G01J 3/02* (2006.01)
*G02F 1/377* (2006.01)
(Continued)

(52) U.S. Cl.
CPC .......... *G01J 3/0208* (2013.01); *G01J 3/0237* (2013.01); *G01J 3/0254* (2013.01); *G02B 6/122* (2013.01); *G02B 6/29365* (2013.01); *G02F 1/377* (2013.01)

(58) Field of Classification Search
CPC ...... G01J 3/0208; G01J 3/0237; G01J 3/0254; G02B 6/122; G02B 6/29365; G02F 1/377
See application file for complete search history.

(56) References Cited

U.S. PATENT DOCUMENTS 5,121,030 A  6/1992  Schott
5,214,736 A  5/1993  Uemiya et al.
(Continued)

FOREIGN PATENT DOCUMENTS

DE  10 2010 040 768 A1  3/2012
WO  2011/046875 A1  4/2011
(Continued)

OTHER PUBLICATIONS

International Search Report for PCT/US2017/032005, dated Aug. 21, 2017, 4 pages.
(Continued)

*Primary Examiner* — Jamil Ahmed
(74) *Attorney, Agent, or Firm* — Cozen O'Connor

(57) ABSTRACT

An apparatus includes a substrate transmissive of electromagnetic energy of at least a plurality of wavelengths, having a first end, a second end, a first major face, a second major face, at least one edge, a length, a width, and a thickness, at least a first output optic that outputs electromagnetic energy the substrate; and a first input optic oriented and positioned to provide electromagnetic energy into the substrate via at least one of the first or the second major face of the substrate. The first output optic is laterally spaced from the first input optic. A number of reflectors and optional absorbers may be positioned proximate the first major face and/or the second major face to structure electromagnetic energy and/or to translate such from the first input optic to the first output optic. The apparatus may be part of a spectrometer or other optical system.

30 Claims, 16 Drawing Sheets

(51) Int. Cl.
  *G02B 6/293* (2006.01)
  *G02B 6/122* (2006.01)

(56) References Cited

U.S. PATENT DOCUMENTS

| | | |
|---|---|---|
| 6,507,709 B2 | 1/2003 | Hirai et al. |
| 6,738,551 B2 | 5/2004 | Noda et al. |
| 6,879,451 B1 | 4/2005 | Hewlett et al. |
| 7,065,280 B2 | 6/2006 | Ogawa et al. |
| 7,092,101 B2 | 8/2006 | Brady et al. |
| 7,145,614 B2 | 12/2006 | Lee et al. |
| 7,274,458 B2 | 9/2007 | Perez et al. |
| 7,768,640 B2 | 8/2010 | Cunningham et al. |
| 8,854,624 B2 | 10/2014 | Pervez et al. |
| 2004/0007662 A1 | 1/2004 | Sidorin |
| 2006/0017928 A1 | 1/2006 | Crowther |
| 2008/0224121 A1 | 9/2008 | Bose et al. |
| 2008/0246961 A1 | 10/2008 | Zhang et al. |
| 2012/0206726 A1* | 8/2012 | Pervez ............... G01J 3/0205 356/402 |
| 2013/0216180 A1* | 8/2013 | Tan ..................... G02B 6/3807 385/24 |
| 2016/0327746 A1* | 11/2016 | Mathai ............... G02B 6/29308 |
| 2019/0041264 A1 | 2/2019 | Scholtz et al. |

FOREIGN PATENT DOCUMENTS

| | | |
|---|---|---|
| WO | 2012/057792 A1 | 5/2012 |
| WO | 2012/088117 A1 | 6/2012 |
| WO | 2013/102661 A1 | 7/2013 |
| WO | 2013/158842 A1 | 10/2013 |
| WO | 2015/112169 A1 | 7/2015 |

OTHER PUBLICATIONS

Written Opinion for PCT/US2017/032005, dated Aug. 21, 2017, 6 pages.
International Preliminary Report on Patentability for PCT/US2017/032005, dated Nov. 22, 2018, 8 pages.
International Search Report for PCT/US2016/053925, dated Mar. 27, 2017, 6 pages.
Written Opinion for PCT/US2016/053925, dated Mar. 27, 2017, 8 pages.

* cited by examiner

INTEGRATION OF OPTICAL COMPONENTS WITHIN A FOLDED OPTICAL PATH

This invention was made with Government support under IIP-1152707 awarded by the National Science Foundation. The Government has certain rights in this invention.

TECHNICAL FIELD

The present disclosure relates generally to optical sensors and analytical instruments, for example, spectrometers.

BACKGROUND

Description of the Related Art

Spectrometers are analytical instruments that are able to identify the wavelengths that comprise incident electromagnetic energy (e.g., light), and provide spectral content information or data that characterizes the constituent components of the incident electromagnetic energy. Spectrometers are useful in a large variety of settings and applications. One type of conventional spectrometer typically employs one or more diffraction gratings to spatially separate the wavelengths comprising the incident electromagnetic energy, which wavelengths are then detected by a suitable sensor or detector (e.g., linear sensor or linear detector), the position of the spatially resolved electromagnetic energy on the sensor or detector being indicative of the respective wavelengths. Spectral resolution has been a function in part of distance between the diffraction grating and the sensor or detector. This disadvantageously means that the physical dimensions of the spectrometer must be relatively large in order to obtain high spectral resolution. Typically, components may be oversized and/or the number of components may be minimized to reduce alignment complexity.

Photonic crystals have been suggested for use in spatially resolving the wavelengths in incident light. Photonic crystals can generally be employed in at least three ways. For example, as photonic bandgap structures localize or guide light of certain wavelength ranges in defects because the wavelength range is gapped in the structure (allowed only in the defects). Also for example, as super prisms having enhanced diffraction like properties, allowing a stronger prism effect to be achieved from a given material than might otherwise be possible from that material. As a further example, as scattering structures, which do not have to be as strong as photonic bandgap structures, and in which periodicity is used to intentionally scatter between states of system.

U.S. Pat. No. 8,854,624 generally describes a photonic crystal based spectrometer. U.S. Pat. No. 8,854,624 is an example of use of photonic crystals as scattering structures, and describes scattering from guided modes to free-space propagating modes. The photonic crystal based spectrometer includes a photonic crystal coupled to an outer surface of an optical waveguide to extract a portion of optical energy propagating through the waveguide via the photonic crystal. The photonic crystal comprises a first surface including a first array of periodic features on or with a dielectric material, the first array extending in at least two dimensions and having an effective dielectric permittivity different from that of dielectric material that surrounds the photonic crystal. The periodic features of the photonic crystal are characterized by a specified lattice constant, which at least in part determines the portion of propagating optical energy that will be extracted.

U.S. Pat. No. 8,854,624 illustrates and describes the waveguide as a planar or rectangular waveguide. To achieve propagation (i.e., transmission along a length of the waveguide via total internal reflection for electromagnetic energy entering the waveguide at angles greater than a critical angle for the waveguide), U.S. Pat. No. 8,854,624 teaches injecting the optical energy into the waveguide via an edge of the waveguide. For a planar waveguide, the edge is a minor face or minor boundary of the waveguide characterized by a minor dimension (i.e., thickness), as compared to major faces which are characterized by two major dimensions (i.e., length and width). This edge injection is typically considered necessary since, for planar waveguides, it is the major faces which offer total internal reflection, for instance due to the placement of cladding on or at those major faces.

Optical systems such as spectrometers may require management of input electromagnetic energy along the optical path to control the major propagation direction and range of propagation angles present in a beam of electromagnetic energy. Typically, such systems are created by positioning optical components such as mirrors or lenses along the optical path in free space. These complex assemblies require precision alignment of multiple separate elements, are costly, and require a large volume of space.

BRIEF SUMMARY

Advantageously, an article can employ input optics and/or output optics to facilitate entry of electromagnetic energy (e.g., light including visible, infrared and/or ultraviolet ranges) into an electromagnetic energy transmissive structure, such as a substrate (e.g., optically transmissive substrate, optical waveguide, planar waveguide), via a major face thereof and/or to facilitate extraction or exiting of electromagnetic energy out of the electromagnetic energy transmissive structure. Entry of electromagnetic energy via a major face of the substrate provides a variety of benefits, such as, for example, use of one or more input optics to facilitate or otherwise cause electromagnetic energy to enter the substrate via a major face of the substrate, which is typically smoother or more easily polished than an edge of the substrate. Such may eliminate the need to have highly smooth edges and/or eliminate the need to polish the edges of a substrate or at least reduce the degree to which the edge needs to be polished. Employing input optics to cause electromagnetic energy to enter via a major face may also allow a significant increase in dimensions of an area or region into which electromagnetic energy may be coupled into the substrate. Typically, any given edge of a substrate will have relatively much smaller dimensional area as compared to a major face. For non-circular substrates, substrates or layers, the dimensional area of an edge is typically given by the length times the thickness, or by the width times the thickness, where the thickness is the smaller dimension of the three dimensions, length, width and thickness, noting that the length and width may be equal to one another for square substrates, substrates or layers. Employing input optics to cause electromagnetic energy to enter via a major face may also advantageously avoid the need to physically and/or optically couple to an edge, thereby omitting complicated structures that might otherwise be required. This reduces complexity and cost, and may also allow a significant reduction in package size.

An article can employ various types of nanostructures or regions of nanostructures as input optics and/or output optics, to respectively facilitate entry of electromagnetic energy respectively into and out of an electromagnetic energy transmissive structure such as a substrate. Additionally or alternatively, an article can employ a variety of other types of input optics, for example, apertures, mirrors or reflectors, prisms, focusing optics or lenses, and/or reflective or refractive surfaces to couple electromagnetic energy into the substrate.

Nanostructures can provide periodic structures with dimensions on the scale of nanometers and which can interact with electromagnetic energy, for instance light, in a manner that is characterized by the structural characteristics of the nanostructure array, e.g., a lattice constant of the array or portion thereof. The nanostructures or regions of nanostructures can include photonic crystals, for instance an ordered two-dimensional or three-dimensional array or lattice of photonic crystals. The nanostructures or regions of nanostructures can include plasmonic nanostructures, for instance an ordered two-dimensional or three-dimensional array or lattice of plasmonic nanostructures. The nanostructures or regions of nanostructures can include holographic diffraction nanostructures, for instance an ordered two-dimensional or three-dimensional array or lattice of holographic diffraction nanostructures.

The substrate can, for example, take the form of a plane, substrate or layer of electromagnetic energy transmissive material (e.g., optically transmissive material). The plane, substrate or layer of transmissive material can be generally transmissive of electromagnetic energy of at least certain wavelengths or frequencies of interest (i.e., wavelengths or frequencies to be detected or sensed, e.g., light including visible, infrared and/or ultraviolet ranges), without any propensity to guide the electromagnetic energy (i.e., transmissive without total internal reflection).

Output optics, such as nanostructures, apertures, etc., formed in or on the substrate or otherwise optically coupled to the substrate can cause or allow electromagnetic energy to exit (e.g., be extracted from) the substrate. As a non-limiting example, in some implementations, this approach can be employed to spatially resolve the components of the electromagnetic energy, which can be detected or sensed by a detector or sensor, and converted into information (e.g., raw information in analog or digital form) that is representative of wavelength distribution in the incident light.

One or more implementations of the present disclosure provide a compact and economical way to achieve electromagnetic energy structuring for optical systems (e.g., spectrometers) by folding the optical path inside a transmissive substrate. In at least some of the implementations discussed herein, the path length of electromagnetic energy may be increased beyond the thickness of the substrate by reflectors positioned on or within the major faces of the substrate. Such precision positioning of the optical elements along the path may be economically achieved via nanofabrication of structures on the major faces of the substrate. Nanofabrication provides the ability to precisely position and create a variety of optical elements including planar and non-planar structures that can spatially filter light (e.g., apertures), focus or redirect light (e.g., mirrors, lenses), and/or create spectral separation (e.g., prisms, gratings, nanostructures, filters).

An apparatus may be summarized as including a substrate that is transmissive of electromagnetic energy of at least a plurality of wavelengths, the substrate having a first end, a second end, a first major face, a second major face, at least one edge, a length, a width, and a thickness, the second end opposed to the first end across the length of the substrate, the second major face opposed across the thickness of the substrate from the first major face, the at least one edge which extends between at least a portion of the first major face and a portion of the second major face, the width of the substrate greater than the thickness of the substrate; at least a first input optic oriented and positioned to provide electromagnetic energy into the substrate via at least one of the first or the second major face of the substrate without total internal reflection therein; at least a first output optic spaced along at least one of the length or the width of the substrate from the first input optic; a number of first reflective portions that extend at least partially along the first major face of the substrate, the number of first reflective portions oriented and positioned to control a propagation direction of electromagnetic energy along a folded optical path, at least a portion of which extends through the substrate between the first input optic and the first output optic when electromagnetic energy is incident on the first input optic; and a number of second reflective portions that extend at least partially along the second major face of the substrate, the number of second reflective portions oriented and positioned to control the propagation direction of electromagnetic energy along the folded optical path when electromagnetic energy is incident on the first input optic, wherein a spatial extent of at least one of the number of first reflective portions or the number of second reflective portions spatially limits the electromagnetic energy along the folded optical path. The at least one of the number of first reflective portions or second reflective portions may limit a range of propagation angles of the electromagnetic energy along the folded optical path. At least one of the number of first reflective portions and the number of second reflective portions may include a metal layer. The substrate may be formed of fused silica. The first output optic selectively may extract electromagnetic energy of a first set of wavelengths from at least one of the first or the second major face of the substrate. The first output optic may include a photonic crystal. The photonic crystal may include a one-dimensional, two-dimensional, or a three-dimensional photonic crystal. The first output optic may be positioned in or comprises a gap in a reflective material. The first output optic may be positioned in or comprises a gap in an absorptive material. The first input optic may include an input aperture bordered by a reflective material. The first input optic may include an input aperture bordered by an absorptive material. The length may be greater than or equal to the width and the thickness may be less than the length and less than the width.

The apparatus may further include at least a second output optic spaced along at least one of the length or the width of the substrate from the first input optic and the first output optic. The second output optic may be spaced laterally between the first input optic and the first output optic. The first output optic may include one of a first photonic crystal lattice or a first plasmonic structure.

The apparatus may further include at least a second output optic spaced along at least one of the length or the width of the substrate from the first input optic and the first output optic. The length may be a longest dimension of the substrate and the thickness may be a smallest dimension of the substrate along an axis that may be perpendicular to the length and the width of the substrate. The first major face of the substrate may be parallel to the second major face of the substrate. The first input optic may be selected from the group consisting of a focusing lens, an array of focusing lenses, a prism, an array of prisms, a mirror, an array of mirrors, a reflector, a reflective surface, a reflective boundary, an absorptive boundary, a refractive boundary, an input aperture, and a nanostructure. The first output optic may be selected from the group consisting of a focusing lens, an array of focusing lenses, a prism, an array of prisms, a mirror, an array of mirrors, a reflector, a reflective surface, a reflective boundary, a refractive boundary, an output aperture, and a nanostructure. The first input optic and the first output optic may both be on a same one of the first or the second major face of the substrate. The first input optic and the first output optic may each be on respective ones of the first or the second major face of the substrate.

The apparatus may further include a sensor responsive to one or more of the plurality of wavelengths of electromagnetic energy, the sensor positioned to receive electromagnetic energy which exits the substrate at least via the first output optic. The first input optic may be coupled to input light to the substrate via the first major face of the substrate and the sensor may be a light sensor positioned to receive light which exits the substrate via the second major face of the substrate. The first input optic may input light to the substrate via the first major face of the substrate and the sensor may be a light sensor positioned to receive light which exits the substrate via the first major face of the substrate.

The apparatus may further include a plurality of input optics each oriented and positioned to provide electromagnetic energy into the substrate via at least one of the first or the second major face of the substrate without total internal reflection therein.

The apparatus may further include a plurality of output optics spaced along at least one of the length and the width of the substrate, each of the plurality of output optics outputs electromagnetic energy from at least one of the first or the second major face of the substrate.

The apparatus may further include a plurality of output optics spaced along at least one of the length and the width of the substrate, each of the plurality of output optics outputs electromagnetic energy from at least one of the first or the second major face of the substrate.

The apparatus may further include a spectrally selective element disposed within or on the substrate. The spectrally selective element may include at least one of: a photonic crystal element, a diffractive element, a refractive element, a prismatic element, a scattering element, or a filter element. The spectrally selective element may be disposed within or on the substrate laterally between the first input optic and the first output optic.

The apparatus may further include an optical element disposed at least proximate the first major face or the second major face of the substrate along the folded optical path, the optical element comprising at least one of: a photonic crystal element, a reflection grating, a transmission grating, a dispersive element, a refractive element, a filter, a lens, a light source, or a diffuser.

The apparatus may further include a number of non-reflective portions that extend at least partially along at least one of the first major face or the second major face of the substrate, at least one of the number of non-reflective portions positioned laterally adjacent to at least a portion of at least one of the number of first reflective portions or the number of second reflective portions. Each of the number of non-reflective portions may include an absorptive portion or a transmissive portion. At least one of the number of non-reflective portions may include at least one of paint, paper, coating or a film.

A method of fabricating an apparatus may be summarized as including providing a substrate that is transmissive of electromagnetic energy of at least a plurality of wavelengths, the substrate having a first end, a second end, a first major face, a second major face, at least one edge, a length, a width, and a thickness, the second end opposed to the first end across the length of the substrate, the second major face opposed across the thickness of the substrate from the first major face, the at least one edge which extends between at least a portion of the first major face and a portion of the second major face, the width of the substrate greater than the thickness of the substrate; orienting and positioning at least a first input optic to provide electromagnetic energy into the substrate via at least one of the first or the second major face of the substrate; orienting and positioning at least a first output optic laterally spaced from the first input optic, the first output optic outputs electromagnetic energy from the substrate; orienting and positioning a number of first reflective portions at least partially along the first major face of the substrate, the number of first reflective portions oriented and positioned to control a propagation direction of electromagnetic energy along a folded optical path, at least a portion of which extends through the substrate between the first input optic and the first output optic when electromagnetic energy is incident on the first input optic; orienting and positioning a number of second reflective portions at least partially along the second major face of the substrate, the number of second reflective portions oriented and positioned to control the propagation direction of electromagnetic energy along the folded optical path when electromagnetic energy is incident on the first input optic, wherein a spatial extent of at least one of the number of first reflective portions or the number of second reflective portions spatially limits the electromagnetic energy along the folded optical path. Orienting and positioning a number of first reflective portions and a number of second reflective portions may include orienting and positioning a number of first reflective portions and a number of second reflective portions, and at least one of the number of first reflective portions or second reflective portions may limit a range of propagation angles of the electromagnetic energy along the folded optical path. Orienting and positioning a number of first reflective portions and a number of second reflective portions may include orienting and positioning a number of first reflective portions and a number of second reflective portions, and at least one of the number of first reflective portions and the number of second reflective portions may include a metal layer. Forming the first output optic may include forming at least one of a photonic crystal lattice, a diffuser, an aperture, a lens, a filter or a plasmonic structure. Forming the first output optic may include at least one of patterning, direct molding, or casting the first output optic in a dielectric that comprises the substrate.

Forming a first output optic may include forming a first output optic that outputs electromagnetic energy from the substrate via the first major face of the substrate or the second major face of the substrate, and may further include forming a second output optic that outputs electromagnetic energy from the substrate via the first major face of the substrate or the second major face of the substrate. Orienting and positioning a first input optic may include forming at least one of a focusing lens, an array of focusing lenses, a prism, an array of prisms, a mirror, an array of mirrors, a reflector, a reflective surface, a reflective boundary, an absorptive boundary, a refractive boundary, and a nanophotonic structure. Orienting and positioning a first output optic may include forming at least one of a focusing lens, an array of focusing lenses, a prism, an array of prisms, a mirror, an array of mirrors, a reflector, a reflective surface, a reflective boundary, an absorptive boundary, a refractive boundary, an output aperture, and a nanostructure. Forming a first output optic may include forming a one-dimensional, two-dimensional, or a three-dimensional nanostructure. Forming a first output optic may include forming the first output optic on a same one of the first or the second major face of the substrate as the first input optic. Forming a first output optic may include forming the first output optic on an opposite one of the first or the second major face from the substrate.

The method may further include orienting and positioning a number of non-reflective portions that extend at least partially along at least one of the first major face or the second major face of the substrate. Orienting and positioning a number of non-reflective portions may include orienting and positioning a number of absorptive portions between the substrate and one of the number of first reflective portions or one of the number of second reflective portions. Orienting and positioning a number of non-reflective portions may include orienting and positioning a number of absorptive portions such that at least one of the number of first reflective portions or one of the number of second reflective portions may be between at least one of the number of absorptive portions and the substrate.

The method may further include orienting and positioning an optical element at least proximate to the first major face or the second major face of the substrate along the folded optical path, the optical element comprising: a photonic crystal element, at least one of a reflection grating, a transmission grating, a dispersive element, a refractive element, a filter, a lens, a light source, or a diffuser.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1A:
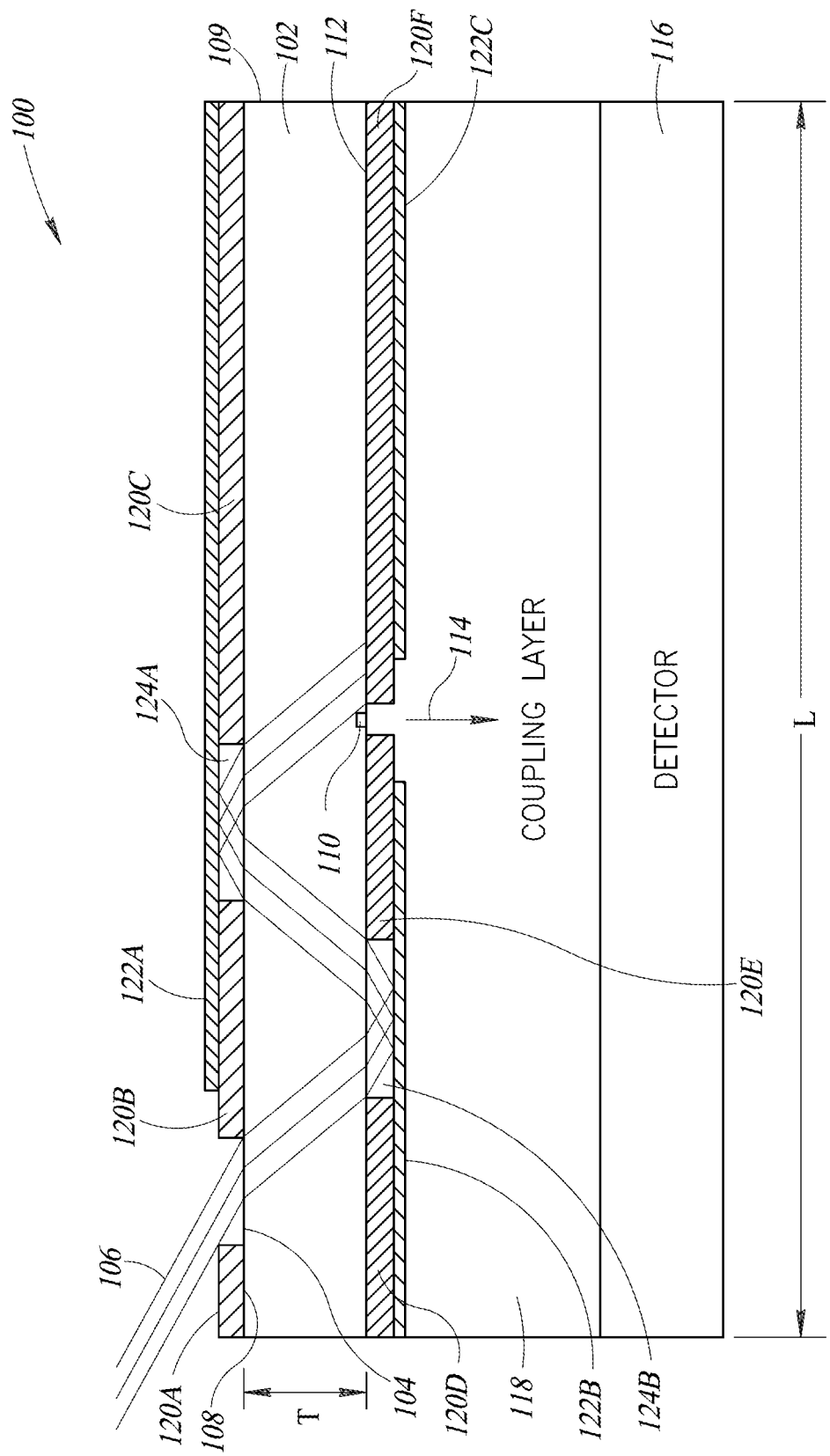
FIG. 1A is an elevational view of an apparatus which includes a substrate with a top major face and a bottom major face, and optics in the form of reflectors and absorbers on the top major face and a bottom major face, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

An article (e.g., spectrometer, component of a spectrometer, other optical device or system) can employ input optics and/or output optics to facilitate entry of electromagnetic energy (e.g., light including visible, infrared and/or ultraviolet ranges) into an electromagnetic energy transmissive structure, such as a substrate, via a major face thereof and/or to facilitate extraction or exiting of electromagnetic energy out of the electromagnetic energy transmissive structure. Entry of electromagnetic energy via a major face of the substrate provides a variety of benefits.

The article can employ various types of input optics and/or output optics, to respectively facilitate entry of electromagnetic energy respectively into and out of an electromagnetic energy transmissive structure such as a substrate. In some implementations, nanostructures can provide periodic structures with dimensions on the scale of nanometers and which can interact with electromagnetic energy, for instance light, in a manner that is characterized by the structural characteristics of the array, e.g., a lattice constant of the array or portion thereof. The nanostructures or regions of nanostructures can include photonic crystals, for instance an ordered two-dimensional or three-dimensional array or lattice of photonic crystals. The nanostructures or regions of nanostructures can include plasmonic nanostructures, for instance an ordered two-dimensional or three-dimensional array or lattice of plasmonic nanostructures. The nanostructures or regions of nanostructures can include diffraction nanostructures, for instance an ordered two-dimensional or three-dimensional array or lattice of holographic diffraction nanostructures, reflective gratings, transmission gratings (e.g., one-dimensional gratings), etc. Additionally or alternatively, the article can employ a variety of other types of input optics, for example, apertures, mirrors or reflectors, absorbers, prisms, focusing optics or lenses, and/or reflective or refractive surfaces.

In some implementations of the present disclosure, electromagnetic energy may be admitted at an angle to a major face of a substrate through an aperture formed via a patterned gap in a reflective or absorptive material (e.g., film or coating). The electromagnetic energy is not guided by the substrate, but may propagate through the substrate and be reflected within the substrate by one or more reflectors (or "reflective portions") defined on at least one of the major faces. The spatial extents of the reflectors may limit the numerical aperture or range of angles of the electromagnetic energy after such reflections. The structured light may be ultimately incident upon a major face of the substrate aligned with or near an output optic (e.g., aperture, diffuser, filter, photonic crystal structure), which may be formed in or defined by a patterned gap in a reflective or absorptive layer, for example. Electromagnetic energy which leaves the substrate due to the interaction with the photonic crystal structure may be delivered to a detector (e.g., linear detector array) for analysis. Additional patterned absorbers (or "absorptive portions") may be integrated on one or both of the major faces of the substrate to improve the stray light management of the apparatus.

In some implementations of the present disclosure, electromagnetic energy (e.g., light) may be admitted at an angle to multiple (e.g., four) input optics (e.g., apertures in a reflective film or absorptive film) positioned on the major faces of a substrate. The substrate may also include multiple (e.g., two) output optics (e.g., photonic crystals, apertures) fabricated on at least one of the major faces of the substrate. The electromagnetic energy may be structured by the input optics and by one or more reflectors defined on the major faces of the substrate along each of a plurality of optical paths to convey structured electromagnetic energy to locations on the major faces of the substrate which include output optics. In some implementations, a first plurality of optical paths emanating from a corresponding first plurality of input optics may convey structured light to a first output optic, and a second plurality of optical paths emanating from a corresponding second plurality of input optics may convey structured light to a second output optic. The electromagnetic energy which exits the substrate due to interaction with one of the output optics may be delivered to one or more detectors (e.g., linear detector array) for analysis, or may be used in any other desirable manner. In such implementations, the input optics may be used separately or simultaneously. In some implementations, additional patterned absorbers may be integrated onto the major faces of the substrate to improve the stray light management of the apparatus.

Some examples of optical elements which may be provided in one or more implementations of the present disclosure include reflectors, spectrally selective elements, absorbers, dispersive and refractive elements, and diffusers. Each of these elements is discussed below.

In some implementations, reflectors may be created on or proximate to major faces of the substrate to increase the optical path length for non-guided electromagnetic energy within the substrate. Additionally, patterned reflectors may be created on or proximate to major faces of the substrate to shape the propagating electromagnetic energy distribution. Each of the reflectors used for shaping the propagating electromagnetic energy distribution may be defined on the same major face of the substrate or on different major faces. In some implementations, patterned reflectors on or proximate to major faces of a substrate may be used to translate input electromagnetic energy toward one or more output optics along a length or width of the substrate, where the length and width of the substrate are defined as directions parallel to a major face. Moreover, reflectors may be used to direct electromagnetic energy along an optical path and/or to direct unwanted electromagnetic energy away from the optical path.

Spectrally selective elements may be created within or on major faces of the substrate to create separation in the wavelength distribution of electromagnetic energy. Examples of spectrally selective elements may include diffractive, refractive, prismatic, scattering, and filter elements. In some implementations, reflection or transmission gratings may be created on a major face of the substrate to create a separation in the wavelength distribution of electromagnetic energy incident upon the feature. Further, interference filters may be created on major faces of the substrate to define a range of wavelengths which remain in the substrate or exit the substrate. As noted above, photonic crystals may be used to scatter electromagnetic energy within the substrate and out of the substrate.

In some implementations, patterned absorbers may be created on one or more major faces of the substrate to alter the propagating electromagnetic energy distribution. Such absorbers are discussed further below.

In some implementations of the present disclosure, patterned dispersive elements (e.g., Fresnel lenses, zone plates) are created on one or more major faces of the substrate to define or reshape the electromagnetic energy distribution along the optical path. A curved mirror may also be created on a major face of the substrate to couple to one or more waveguide modes of the substrate or to reshape non-guided electromagnetic energy along the optical path.

In some implementations, a diffuser may be created on one or more of the major faces of the substrate to alter the incident or exiting angular distribution of electromagnetic energy. Patterned diffusers may also be created on one or more major faces of the substrate to alter the angular distribution of a specific portion of electromagnetic energy along the optical path.

For at least some of the implementations discussed herein, optical structures created on or proximate to major faces may be created by nanofabrication, bonding, or alignment of external components to the substrate, for example. Features on opposing major faces of the substrate may be aligned to achieve the desired alteration of electromagnetic energy distribution along the folded optical path.

Further, optical structures may be created on or proximate to major faces of the substrate to define a specified numerical aperture, viewing angle or range of angles. In some implementations, the viewing angle may be defined using multiple features positioned on one or more major faces of the substrate. In some instances, the defining optical features used to define viewing angle may be separated by non-defining optical features along the folded optical path.

FIG. 1A shows an apparatus 100, according to one illustrated implementation. The apparatus 100 includes a substrate 102 which transmits electromagnetic energy of at least a set of wavelengths or frequencies that are of interest (i.e., ranges of wavelengths or frequencies that are to be detected or sensed or measured, e.g., electromagnetic energy in the optical range of wavelengths including electromagnetic energy in the visible range, the infrared range and the ultraviolet range of the electromagnetic spectrum).

The apparatus 100 also includes one or more input optics 104 positioned and oriented to cause input electromagnetic energy (represented by a set of three lines 106) incident on the input optic(s) to pass into the substrate 102 via a top major face 108 (as shown) of the substrate 102. Such may be advantageous as compared to edge injection of electromagnetic energy into a substrate.

The apparatus 100 further includes an output optic 110 laterally spaced from the input optic 104 along a length L of the substrate 102. In at least some implementations, the output optic 110 is in the form of regions of nanostructures, positioned and oriented proximate to a bottom major face 112 (as shown) to cause at least a portion of the collimated component of electromagnetic energy (represented by an arrow 114 in FIGS. 1A and 2A) to pass out of the substrate 102. The output optic 110 may be formed in a respective layer or structure that is distinct from the substrate 102. In some implementations, the output optic 110 may be formed directly on and/or in the substrate 102. While illustrated as employing one output optic 110, some implementations may employ more than one output optic (see FIG. 4). Where there are two or more output optics, the output optics may be generally spaced along at least a length L of the substrate 102.

The top major face 108 and the bottom major face 112 are faces of the substrate 102, and are distinguishable from an edge 109 of the substrate 102 in that major faces 108 and 112 extend along two major axes of the substrate 102, that is the length L and the width W (see FIG. 3B), while the edge 109 extends along a minor axis, that is thickness T. It should be noted that in some implementations, the length L and the width W of the substrate 102 are unequal to each other, the substrate 102 have a rectangular profile. In other implementations, the length L and the width W of the substrate 102 are equal to one another, the substrate 102 have a square profile. In some instances, the substrate may transmit electromagnetic energy without total internal reflection. For example, in some implementations, the substrate transmits all electromagnetic energy that enters the substrate without total internal reflection.

The apparatus 100 may optionally include one or more detectors 116 (only one shown), positioned to detect electromagnetic energy that passes out of the substrate 102. As illustrated in FIG. 1A, the detector 116 may be separated from the output optic 110 by a coupling layer or spacer 118 of a suitable thickness (e.g., 3 mm, less than 3 mm). In some implementations, one or more optical fibers (e.g., a faceplate) may extend between the output optics 110 and the detector 116. The coupling layer 118 or optical fibers are at least transmissive of electromagnetic energy of at least a set of wavelengths or frequencies that are of interest, and in most implementations, propagate light entering at such appropriate angles via total internal reflection from the output optics 110 to the detector 116.

The detector(s) 116 may take any of a variety of forms. For example, the detector(s) 116 may advantageously take the form of one or more optical detectors, sensors or transducers that are responsive to optical wavelengths or frequencies of electromagnetic energy, e.g., light in the visible, infrared and/or ultraviolet portions of the electromagnetic spectrum. Also for example, the detector(s) 116 may advantageously take the form of one or more optical linear detector arrays which are responsive to light at various positions along a length of the detector 116. The detector(s) 116 may, for example, take the form of one or more charge-coupled devices (CCDs), and/or one or more complementary-metal-oxide-semiconductor (CMOS) image detectors and/or other optical detector(s), sensor(s) or transducer(s) that produce signals (e.g., electrical signals) in response to incident light.

The substrate 102 is typically transmissive of light, allowing light to propagate unguided within the substrate 102. The substrate 102 may advantageously take the form of a dielectric substrate. In some implementations, the substrate 102 may generally transmit electromagnetic energy at least of a set of wavelengths or frequencies that are of interest (i.e., ranges of wavelengths or frequencies that is or are to be detected or sensed or measured). Such transmission is without total internal reflection. As a non-limiting example, the substrate 102 may be formed from fused silica.

Electromagnetic energy may be indiscriminately transmitted throughout the substrate 102. In some example implementations, nanostructures formed in or on the substrate 102 or otherwise optically coupled to the substrate can cause specific wavelength components of the electromagnetic energy to exit (e.g., be extracted from) the substrate. This approach can be employed to spatially resolve the components of the electromagnetic energy, which can be detected or sensed by a detector or sensor, and converted into information (e.g., raw information in analog or digital form) that is representative of wavelength distribution in the incident light. In other implementations, one or more other types of output optics may be included, such as apertures, filters, diffusers, lenses, etc.

In some implementations, the apparatus 100 includes a number of reflector portions or regions 122A-122C ("reflectors") and may optionally include a number of absorber portions or regions 120A-120F ("absorbers"). In the illustrated example of FIG. 1A, absorbers 120A-120C are proximate (e.g., adjacent or above) the top major face 108 of the substrate 102 and the absorbers 120D-120F are proximate (e.g., adjacent or below) the bottom major face 112 of the substrate. The reflector 122A is proximate the top major face 108 of the substrate 102 and the reflectors 122B-122C are proximate the bottom major face 112 of the substrate.

In some implementations, the reflectors 122 may be formed from reflective biaxially-oriented polyethylene terephthalate material (e.g., reflective Mylar®), deposited metal (e.g., aluminum), etc. In some implementations, the absorbers 120 may be formed from paint (e.g., black paint), paper (e.g., black paper), an absorptive coating or film, etc.

The input optic 104, absorbers 120, reflectors 122 and/or output optic 110 may each be formed in one or more layers which resides adjacent or proximate one of the top major face 108 or the bottom major face 112 of the substrate 102. Alternatively or additionally, one or more of such components may be distinct unitary separable elements that may or may not span the entire major faces. As another alternative, one or more of such components may be integrated into or directly on the substrate 102.

In the apparatus 100 of FIG. 1A, the reflector regions 122 and absorber regions 120 are defined on both the top and bottom major faces to structure the range of angles of the electromagnetic energy 106. For example, the spatial extent of the reflector 122B spatially limits the electromagnetic energy reflected by the reflector 122B. The absorbers 120D and 120E adjacent the reflector 122B function to manage stray light. In some implementations, absorbers may not be present adjacent the top or bottom major faces of the substrate 102. In such implementations, light which passes adjacent a reflector may simply be transmitted out of the substrate 102, where it may be absorbed by another component (e.g., an absorptive feature or system within a housing which contains the substrate 102). Similarly, the spatial extent of the reflector 122A spatially limits the electromagnetic energy reflected by the reflector 122A. The structured electromagnetic energy 106 is incident on the absorber 120F proximate the output optic 110 (e.g., photonic crystal) which terminates the optical path of the electromagnetic energy. In implementations wherein one or more of the absorbers 120 are not present, the electromagnetic energy which is not incident on the reflectors 122A or 122B may exit the substrate 102 (e.g., to be absorbed by another component of an optical system).

By selecting the patterns of reflectors (and optionally absorbers) which face each of the top major face 108 and the bottom major face 112 of the substrate, the electromagnetic energy may be shaped and translated along a folded optical path from the input optic 104 to the output optic 110 (or at least adjacent to the output optic 110). For example, such patterns may be selected to limit the numerical aperture of the electromagnetic energy incident on or adjacent to the output optic 110 and/or to limit the range of propagation angles of the electromagnetic energy within the substrate 102. Photons that are incident on the output optic 110 may pass out of the substrate 102, whether those photons are from a light beam or ray that has a principal axis that directly intersects the output optic 110, or has a principal axis that does not directly intersect the output optic 110, for instance a light beam or ray that has a principal axis that intersects a location that is adjacent the output optic.

In FIG. 1A, the reflectors 122 and absorbers 120 are shown as stacked layers external to the substrate 102 (e.g. with an air gaps 124A-124B in the negative spaces of the absorbers), but the in some implementations these structures may be fabricated directly on the major faces 108 and 112 of the substrate 102 using nanofabrication techniques.

Figure 1B:
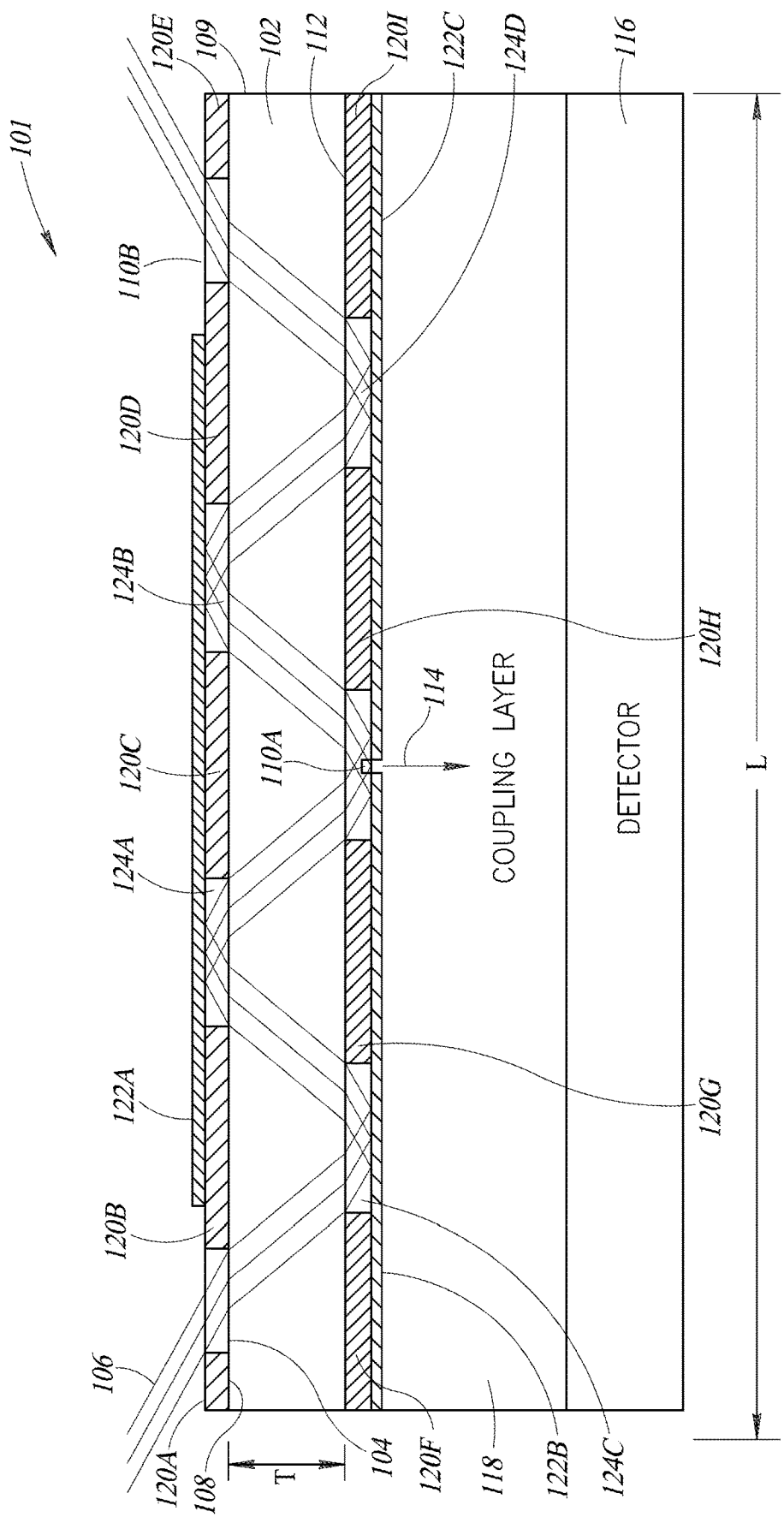
FIG. 1B is an elevational view of an apparatus which includes a substrate, optics in the form of reflectors and absorbers on a top major face and a bottom major face of the substrate, and an output optic (e.g., an aperture) located along the top major face, according to one illustrated implementation.

FIG. 1B shows an apparatus 101, according to one illustrated implementation. The apparatus 101 is in many respects similar to the apparatus 100 (FIG. 1A), thus, similar or even identical structures or elements are identified by the same reference numbers as used in the implementation of FIG. 1A. In the interest of conciseness, only significant differences are discussed below.

In the apparatus 101 of FIG. 1B, the reflector regions 122 and absorber regions 120 are defined on both the top and bottom major faces to structure the range of angles of the electromagnetic energy 106. For example, the spatial extent of the reflector 122B spatially limits the electromagnetic energy reflected by the reflector 122B. The absorbers 120F and 120G adjacent the reflector 122B function to manage stray light. In some implementations, absorbers may not be present adjacent the top or bottom major faces of the substrate 102. In such implementations, light which passes adjacent a reflector may simply be transmitted out of the substrate 102, where it may be absorbed by another component (e.g., an absorptive feature or system within a housing which contains the substrate 102). Similarly, the spatial extent of the reflector 122A spatially limits the electromagnetic energy reflected by the reflector 122A. The structured electromagnetic energy 106 is incident on the output optic 110 (e.g., photonic crystal) and the surrounding reflectors 122B and 122C. The electromagnetic energy reflected by the reflectors 122B and 122C is transmitted out of the substrate 102 via the output optic 110B (e.g., aperture).

By selecting the patterns of reflectors (and optionally absorbers) which face each of the top major face 108 and the bottom major face 112 of the substrate, the electromagnetic energy may be shaped and translated along a folded optical path from the input optic 104 to the output optics 110A and 110B. For example, such patterns may be selected to limit the electromagnetic energy incident on the output optic 110A and/or to limit the range of propagation angles of the electromagnetic energy within the substrate 102.

Figure 1C:
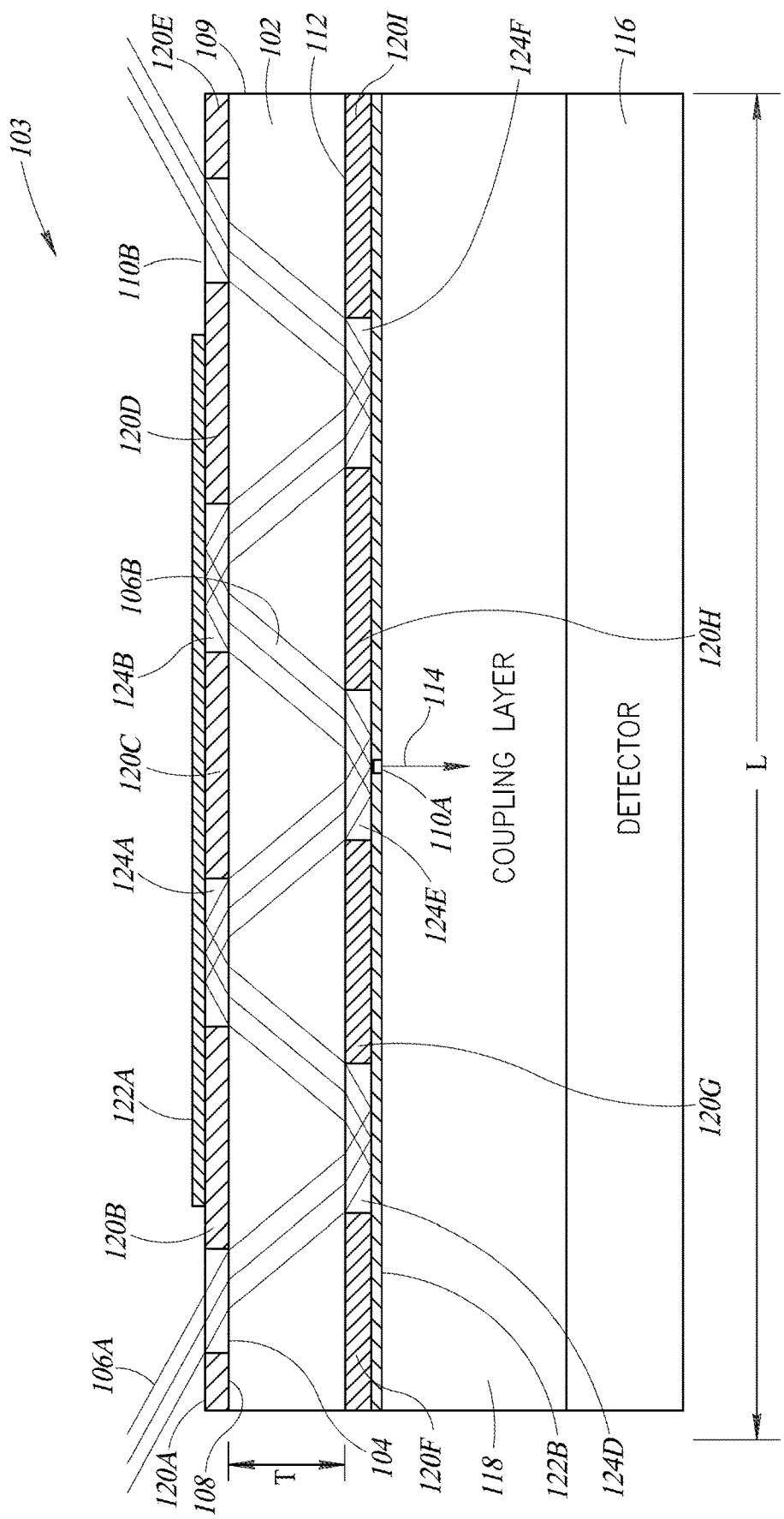
FIG. 1C is an elevational view of an apparatus which includes a substrate, optics in the form of reflectors and absorbers on a top major face and a bottom major face of the substrate, an output optic (e.g., photonic crystal) located along the bottom major face that leads to a detector, and an output optic (e.g., an aperture) located along the top major face that provides an exit from the substrate, according to one illustrated implementation.

FIG. 1C shows an apparatus 103, according to one illustrated implementation. The apparatus 103 is in many respects similar to the apparatus 100 (FIG. 1A), thus, similar or even identical structures or elements are identified by the same reference numbers as used in the implementation of FIG. 1A. In the interest of conciseness, only significant differences are discussed below.

In the apparatus 103 of FIG. 1C, the reflector regions 122 and absorber regions 120 are defined on both the top and bottom major faces to structure the range of angles of the electromagnetic energy 106A. For example, the spatial extent of the reflector 122B spatially limits the electromagnetic energy reflected by the reflector 122B. The absorbers 120F and 120G adjacent the reflector 122B function to manage stray light. Similarly, the spatial extent of the reflector 122A spatially limits the electromagnetic energy reflected by the reflector 122A. The structured electromagnetic energy 106A is incident on the output optic 110A (e.g., photonic crystal), which is covered by a thin film of the reflector 122B. The reflector 122B may transmit at least some unscattered (zero order) and/or scattered (first order) electromagnetic energy to the detector 116 via the output optic 110A (represented by arrow 114). The reflector 122B may reflect at least some of the unscattered (zero order) and/or scattered (first order) electromagnetic energy 106B along an optical path that results in at least some of the reflected electromagnetic energy 106B exiting the substrate 102 at output optic 110B (e.g., aperture).

By selecting the patterns of reflectors (and optionally absorbers) which face each of the top major face 108 and the bottom major face 112 of the substrate 102, the electromagnetic energy 106A may be shaped and translated along a folded optical path from the input optic 104 to the output optics 110A and 110B. For example, such patterns may be selected to limit the electromagnetic energy incident on the output optic 110A and 110B and/or to limit the range of propagation angles of the electromagnetic energy within the substrate 102.

Figure 1D:
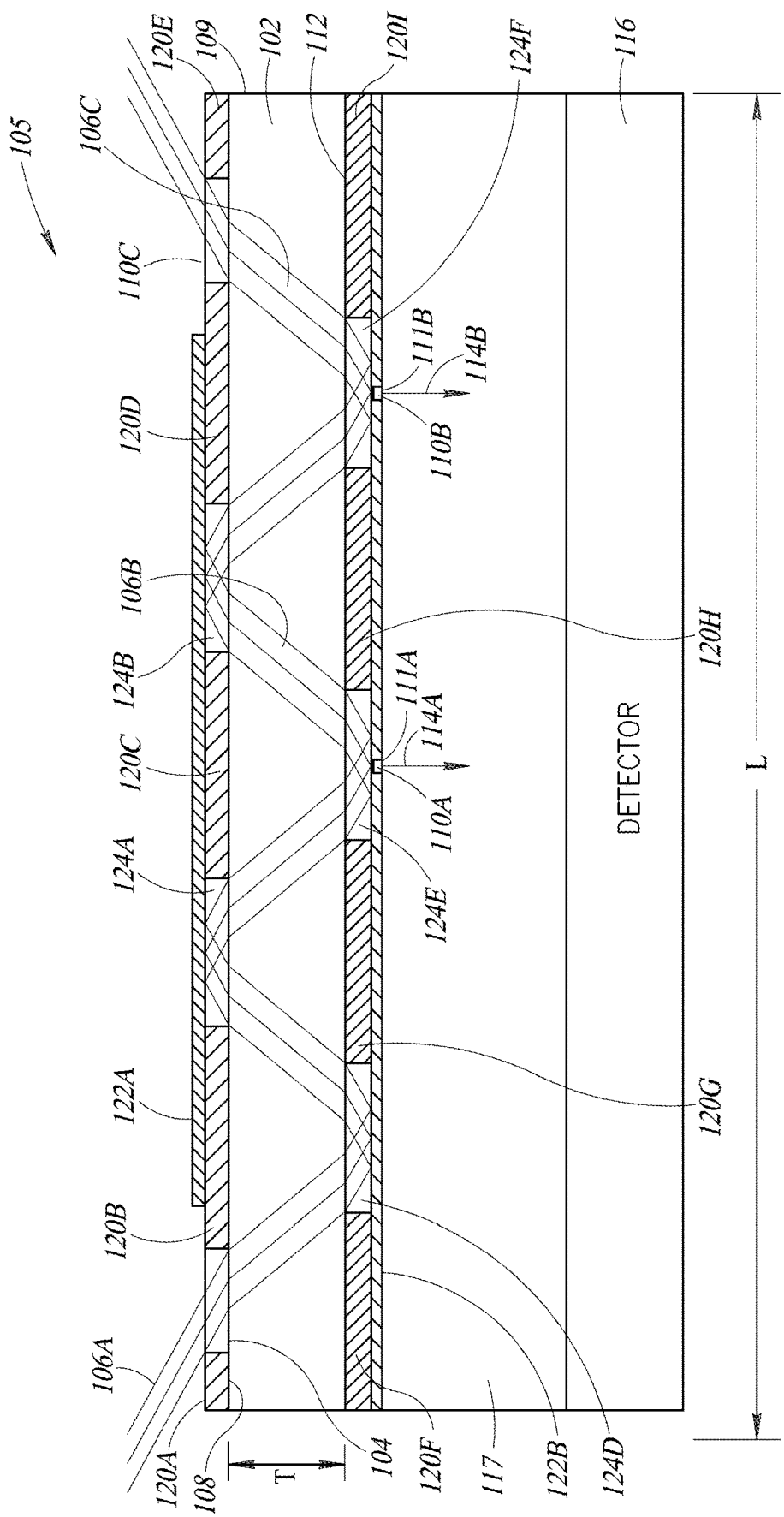
FIG. 1D is an elevational view of an apparatus which includes a substrate, optics in the form of reflectors and absorbers on a top major face and a bottom major face of the substrate, output optics (e.g., photonic crystals) located along the bottom major face that lead to a detector, and an output optic (e.g., an aperture) located along the top major face that provides an exit from the substrate, according to one illustrated implementation.

FIG. 1D shows an apparatus 105, according to one illustrated implementation. The apparatus 105 is in many respects similar to the apparatus 100 (FIG. 1A), thus, similar or even identical structures or elements are identified by the same reference numbers as used in the implementation of FIG. 1A. In the interest of conciseness, only significant differences are discussed below.

In the apparatus 105 of FIG. 1D, the reflector regions 122 and absorber regions 120 are defined on both the top and bottom major faces to structure the range of angles of the electromagnetic energy 106A. For example, the spatial extent of the reflector 122B spatially limits the electromagnetic energy reflected by the reflector 122B. The absorbers 120F and 120G adjacent the reflector 122B function to manage stray light. Similarly, the spatial extent of the reflector 122A spatially limits the electromagnetic energy reflected by the reflector 122A. The structured electromagnetic energy 106A is incident on the output optic 110A (e.g., photonic crystal), which is covered by a thin film of the reflector 122B. The reflector 122B may transmit at least some unscattered (zero order) and/or scattered (first order) electromagnetic energy (represented by arrow 114A) to the detector 116 via the output optic 110A and aperture 111A. The reflector 122B may reflect at least some of the unscattered (zero order) and/or scattered (first order) electromagnetic energy 106B along an optical path that results in at least some of the reflected electromagnetic energy 106B being incident on output optic 110B (e.g., photonic crystal), which is covered by a thin film of the reflector 122B. The reflector 122B may transmit at least some unscattered (zero order) and/or scattered (first order) electromagnetic energy (represented by arrow 114B) to the detector 116 via the output optic 110B and aperture 111B. The reflector 122B may reflect at least some of the unscattered (zero order) and/or scattered (first order) electromagnetic energy 106C along an optical path that results in at least some of the reflected electromagnetic energy 106C exiting the substrate 102 at output optic 110C (e.g., aperture).

The layer 117 may be of a suitable thickness (e.g., 3 mm, less than 3 mm) to separate the output optics 110A and 110B from the detector 116. The path length between the output optics 110A and 110B and the associated apertures 111A and 111B may be such that little or no scattering of the electromagnetic energy occurs when the electromagnetic energy traverses the layer 117. In such an instance, the layer 117 may optionally include material without a low index of refraction.

By selecting the patterns of reflectors (and optionally absorbers) which face each of the top major face 108 and the bottom major face 112 of the substrate 102, the electromagnetic energy 106A may be shaped and translated along a folded optical path from the input optic 104 to the output optics 110A and 110B. For example, such patterns may be selected to limit the electromagnetic energy incident on the output optic 110A and 110B and/or to limit the range of propagation angles of the electromagnetic energy within the substrate 102. Although two output optics 110A and 110B are shown that transmit electromagnetic energy to the detector 116 in FIG. 1D, more output optics 110 and/or fewer output optics 110 may be used in other implementations to transmit electromagnetic energy to the detector 116.

Figure 2A:
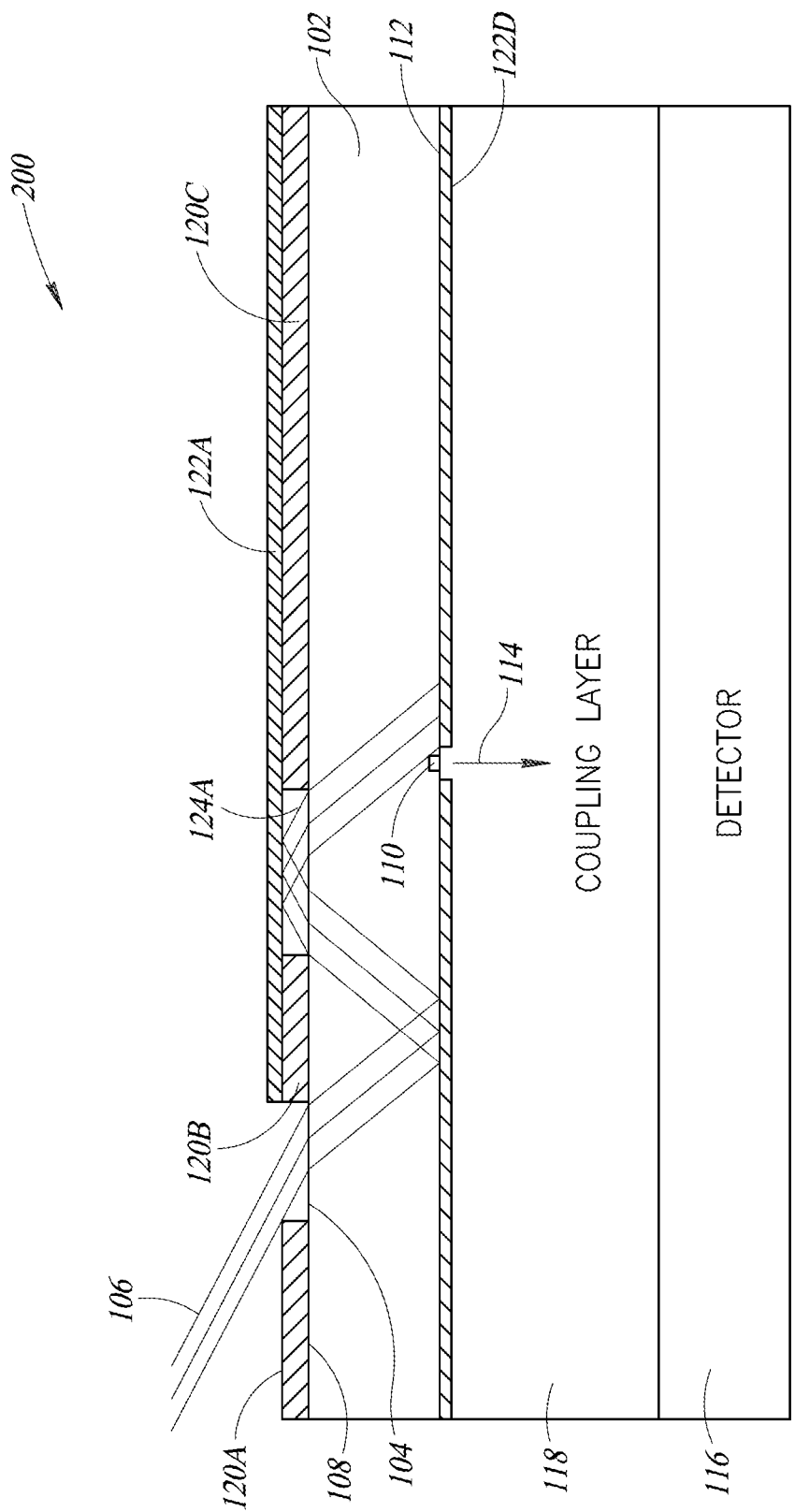
FIG. 2A is an elevational view of an apparatus which includes a substrate and optics in the form of structuring reflectors and absorbers on a top major face of the substrate and non-structuring reflectors on a bottom major face of the substrate, according to one illustrated implementation.

FIG. 2A shows an apparatus 200, according to one illustrated implementation. The apparatus 200 is in many respects similar to the apparatus 100 (FIG. 1A), thus, similar or even identical structures or elements are identified by the same reference numbers as used in the implementation of FIG. 1A. In the interest of conciseness, only significant differences are discussed below.

In the apparatus 200, the structuring optics (e.g., reflector 122A) are defined proximate the top major face 108 similar to the apparatus 100 discussed above. In contrast to the apparatus 100, the apparatus 200 includes a non-structuring reflector(s) 122D proximate the bottom major face 112 of the substrate 102. Thus, in the apparatus 200, structuring reflections are interspersed with non-structuring reflections. The structured electromagnetic energy 106 emanating from the gap 124A is incident on the reflector 122D proximate the output optic 110 (e.g., photonic crystal, aperture, etc.) which redirects the electromagnetic energy to the absorber 120C proximate the top major face 108 of the substrate, which terminates the optical path for the electromagnetic energy. The reflection from the reflector 122D to the absorber 120C is not shown for clarity. As discussed above, in some implementations the reflectors may not be bounded by absorbers. In such implementations, one or more of the reflectors may be bounded by a transmissive portion or other non-reflective portion.

Figure 2B:
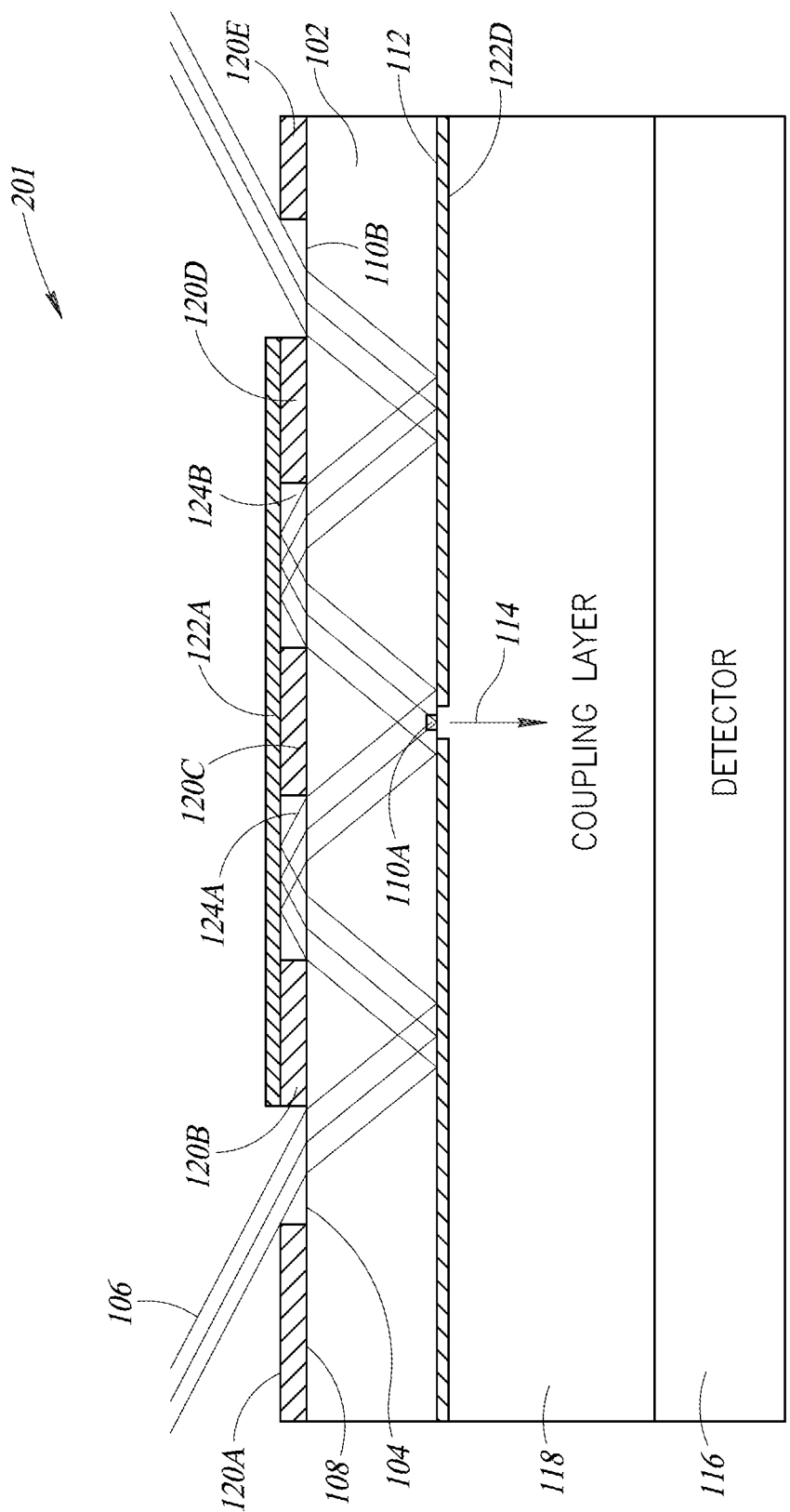
FIG. 2B is an elevational view of an apparatus which includes a substrate, optics in the form of structuring reflectors and absorbers on a top major face of the substrate and non-structuring reflectors on a bottom major face of the substrate, and an output optic (e.g., aperture) located along the top major face, according to one illustrated implementation.

FIG. 2B shows an apparatus 201, according to one illustrated implementation. The apparatus 201 is in many respects similar to the apparatus 100 (FIG. 1A) and the apparatus 200 (FIG. 2A), thus, similar or even identical structures or elements are identified by the same reference numbers as used in the implementations of FIG. 1A and FIG. 2A. In the interest of conciseness, only significant differences are discussed below.

In the apparatus 201, the structuring optics (e.g., reflector 122A) are defined proximate the top major face 108 similar to the apparatus 100 and to the apparatus 200 discussed above. The apparatus 201 includes a non-structuring reflector(s) 122D proximate the bottom major face 112 of the substrate 102. Thus, in the apparatus 201, structuring reflections are interspersed with non-structuring reflections. The structured electromagnetic energy 106 emanating from the gap 124A is incident on the reflector 122D and the output optic 110A (e.g., photonic crystal, aperture), with the reflector 122D redirecting at least some of the electromagnetic energy along an optical path to exit the substrate 102 via the output optic 110B (e.g., aperture) along the top major face 108 of the substrate 102. As discussed above, in some implementations the reflectors may not be bounded by absorbers. In such implementations, one or more of the reflectors may be bounded by a transmissive portion or other non-reflective portion.

Figure 3A:
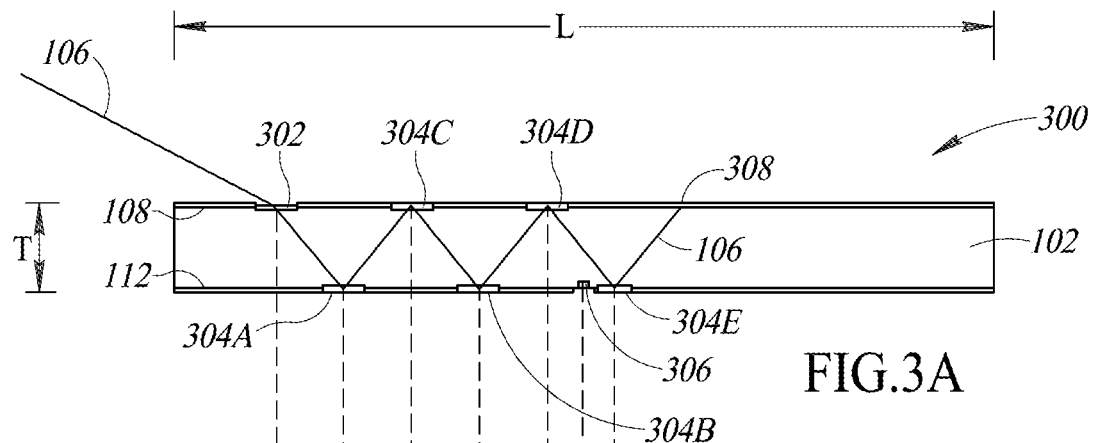
FIG. 3A is an elevational view of an apparatus which structures and translates electromagnetic energy from an input optic to an output optic within a substrate, according to one illustrated implementation.
Figure 3B:
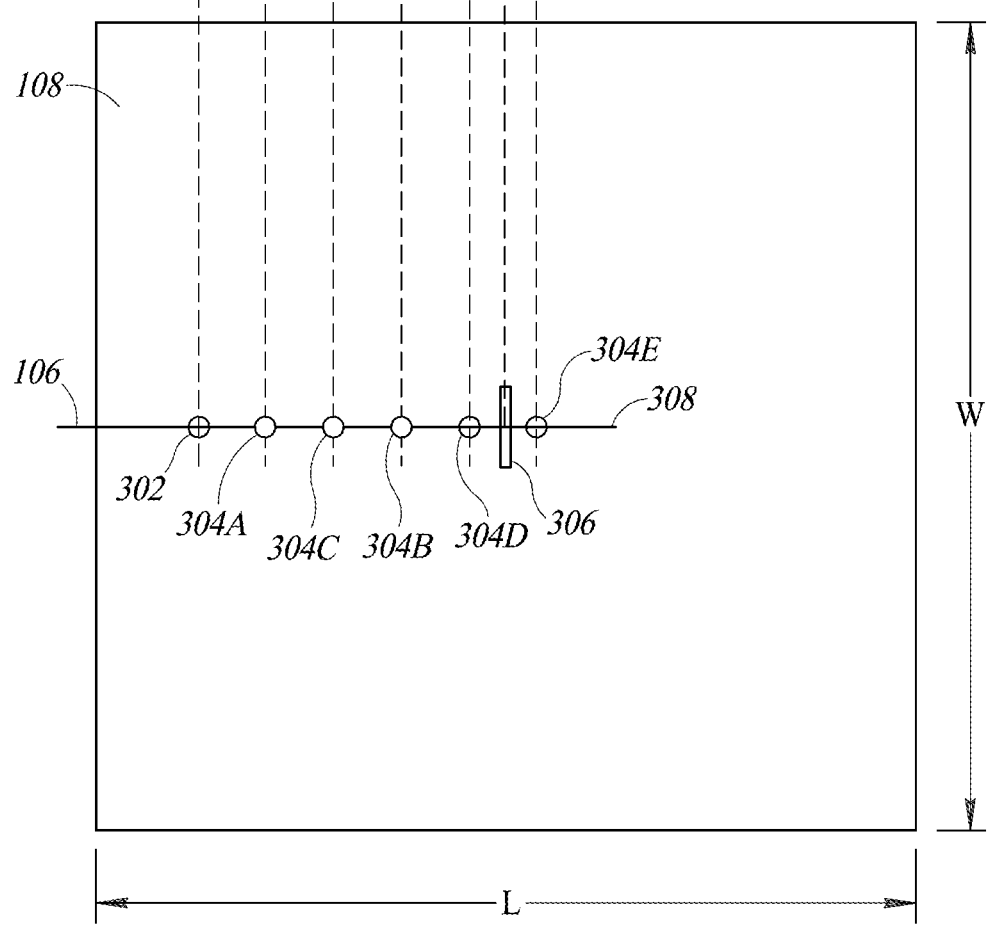
FIG. 3B is a top view of the apparatus of FIG. 3A, according to one illustrated implementation.

FIGS. 3A and 3B show elevational and top views, respectively, of an apparatus 300, according to one illustrated implementation. The apparatus 300 is in many respects similar to the apparatus 100 (FIG. 1A), apparatus 101 (FIGS. 1B-1D), 200 (FIG. 2A), and 201 (FIG. 2B). Thus similar or even identical structures or elements are identified by the same reference numbers as used in the implementations of FIGS. 1A-1D and 2A-2B. In the interest of conciseness, only significant differences are discussed below.

The apparatus 300 includes an input optic 302 which may, in some implementations, comprise an opening in a reflector (e.g., reflective layer) or an opening in an absorber (e.g., absorptive layer). In such instances, the input optic 302 may utilize a reflector to direct unwanted electromagnetic energy away from the optical path of the electromagnetic energy 106, or may use an absorber to absorb the unwanted electromagnetic energy. The apparatus 300 includes a number of reflectors 304A-304E (five shown, collectively 304) which are used to shape the electromagnetic energy 106 along the optical path and to laterally translate the structured light along the length L of the substrate 102 to a desired interaction location which includes an output optic 306 (e.g., photonic crystal, output aperture). In the example, shown, the structured light is laterally translated to the reflector 304E which is adjacent the output optic 306. The reflector 304 reflects the structured light to a location 308 at the top major face 108 of the substrate 102 where the light may exit the substrate or may be absorbed by an absorptive layer. It should be appreciated that in implementations wherein the output optic 306 comprises an output optic other than a photonic crystal, the structured light may be directed to be incident directly on the output optic rather than directed to be incident upon a location which is adjacent the output optic. Additionally, where the output optic is an aperture rather than a nanostructure and the electromagnetic energy is incident directly upon the output optic, the collimated component of the electromagnetic energy (represented by the arrow 114) passes out of the substrate 102.

In some implementations, at least some of the reflectors are bounded by absorbers which absorb the light not reflected by the reflectors. In some implementations, at least some of the reflectors are not bounded by absorbers such that light not reflected by the reflectors exits the transmissive substrate 102. FIG. 3B shows the alignment between structures on the top major face 108 and the bottom major face 112 of the substrate. Such structures may be created using a nanofabrication process, for example. In some implementations, additional patterned absorbers may be positioned proximate one or both of the major faces 108 and 112 of the substrate 102 to further shape the electromagnetic energy and/or to improve the stray light management of the apparatus 300.

Figure 3C:
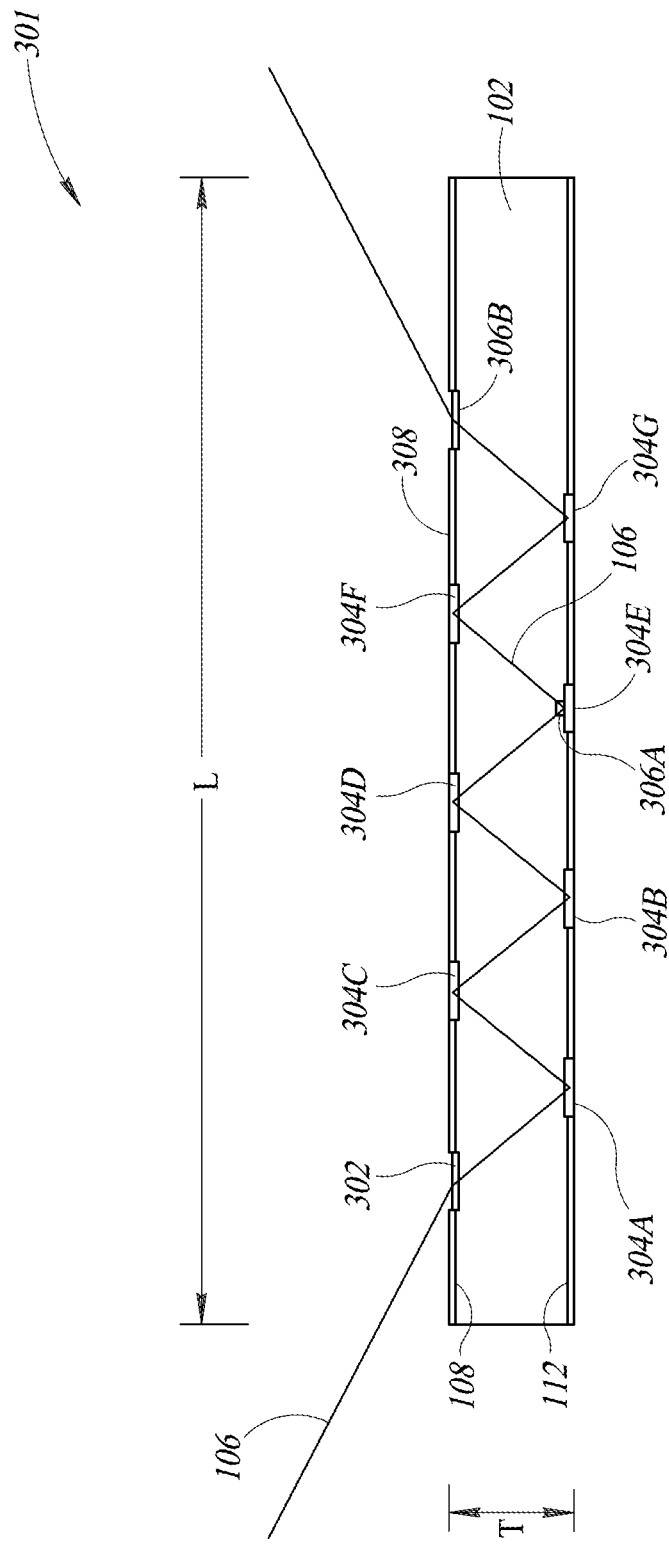
FIG. 3C is an elevational view of an apparatus which structures and translates electromagnetic energy from an input optic to be incident on an output optic within a substrate, according to one illustrated implementation.

FIG. 3C shows an apparatus 301, according to one illustrated implementation. The apparatus 301 is in many respects similar to the apparatus 300 (FIGS. 3A and 3B). Thus, similar or even identical structures or elements are identified by the same reference numbers as used in the implementations of FIGS. 3A and 3B. In the interest of conciseness, only significant differences are discussed below.

The apparatus 301 includes an input optic 302 which may, in some implementations, comprise an opening in a reflector (e.g., reflective layer) or an opening in an absorber (e.g., absorptive layer). In such instances, the input optic 302 may utilize a reflector to direct unwanted electromagnetic energy away from the optical path of the electromagnetic energy 106, or may use an absorber to absorb the unwanted electromagnetic energy. The apparatus 301 includes a number of reflectors 304A-304G (seven shown, collectively 304) which are used to shape the electromagnetic energy 106 along the optical path and to laterally translate the structured light along the length L of the substrate 102 to a desired interaction location which includes an output optic 306A (e.g., photonic crystal, output aperture). In the example shown, the structured light is laterally translated to the reflector 304E and the output optic 306A. The reflector 304E reflects the structured light along an optical path to an output optic 306B at the top major face 108 of the substrate 102 where the light may exit the substrate. In some implementations, at least some of the reflectors are bounded by absorbers which absorb the light not reflected by the reflectors. In some implementations, at least some of the reflectors are not bounded by absorbers such that light not reflected by the reflectors exits the transmissive substrate 102.

Figure 4:
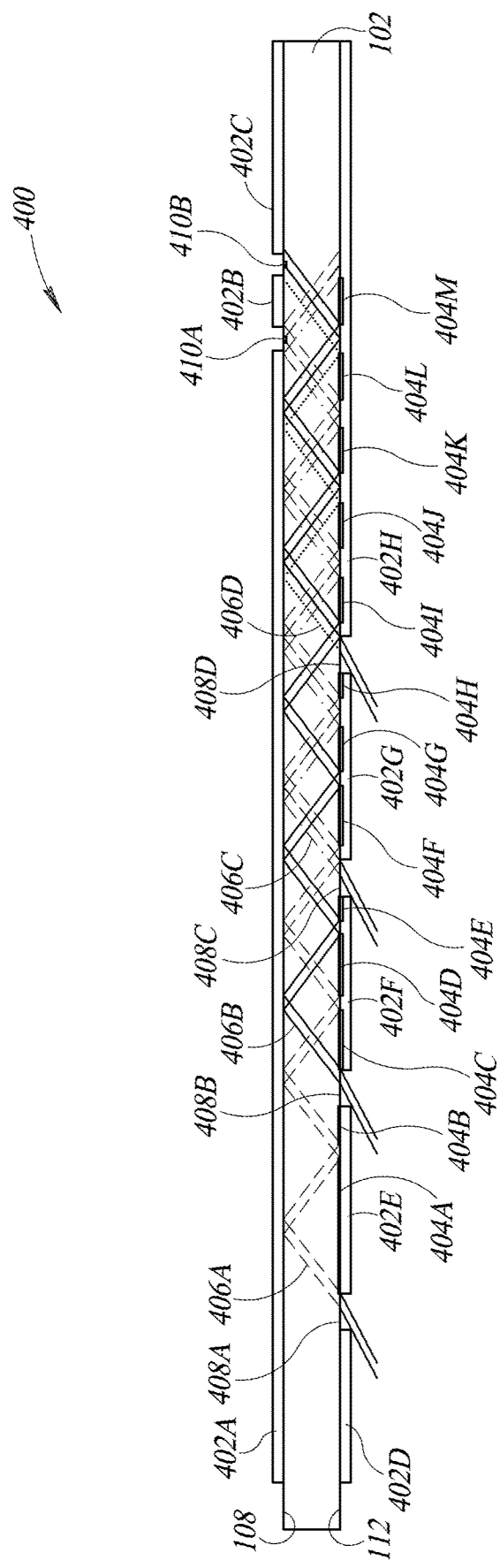
FIG. 4 is an elevational view of an apparatus which defines four optical paths within a substrate and includes two output optics, according to one illustrated implementation.

FIG. 4 shows an apparatus 400, according to one illustrated implementation. The apparatus 400 is in many respects similar to the apparatus 100 (FIG. 1A), 101 (FIGS. 1B-1D), 200 (FIG. 2A), 201 (FIG. 2B), 300 (FIGS. 3A-3B), and 301 (FIG. 3C). Thus similar or even identical structures or elements are identified by the same reference numbers as used in the implementations of FIGS. 1A-1D, 2A-2B, and 3A-3C. In the interest of conciseness, only significant differences are discussed below.

The apparatus 400 includes a number of reflectors 402A-402H (collectively 402) and a number of optional absorbers 404A-404M (collectively 404) which together define four optical paths 406A-406D within the substrate 102. The apparatus 400 includes four input optics 408A-408D which receive electromagnetic energy from the four optical paths 406A-406D, respectively. In some implementations, each of the input optics 408A-408D may comprise an aperture in a reflective material, which reflective material directs unwanted electromagnetic energy away from the respective optical path. In other implementations, one or more of the input optics 408A-408D may comprise an aperture in an absorptive material, which absorptive material absorbs unwanted electromagnetic energy.

After entering the substrate 102, electromagnetic energy is structured along the four optical paths 406A-406D via reflection along the major face interfaces defined by the reflectors 402. The absorbers 404 may function to manage stray light which is not reflected by the reflectors 402. In the illustrated example, the optical paths 406A-406D are defined to direct electromagnetic energy to four locations on the top major face 108 of the substrate 102 which are adjacent to two different output optics 410A and 410B defined within or on the top major face 108 of the substrate 102. In particular, the reflectors 402 structure and direct electromagnetic energy along the optical paths 406A and 406C to two locations on the top major face 108 of the substrate 102 which are adjacent the output optic 410A, and the reflectors structure and direct electromagnetic energy along the optical paths 406B and 406D to two locations on the top major face of the substrate which are adjacent the output optic 410B. In some instances, some or all of the optical paths 406A-406D are defined to direct electromagnetic energy to four locations on the top major face 108 of the substrate 102 such that the electromagnetic energy is incident on one or more of the two different output optics 410A and 410B.

Figure 5A:
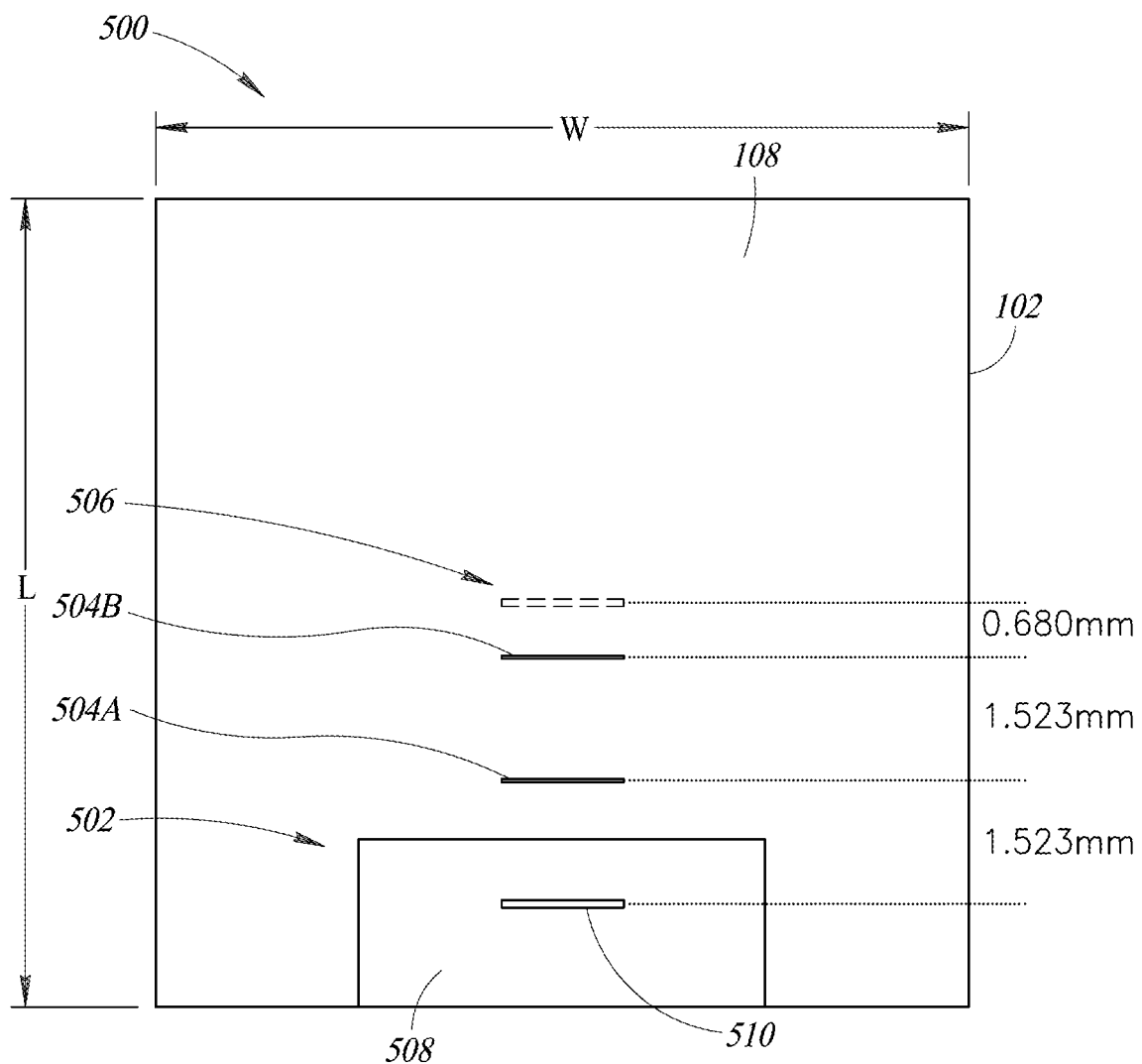
FIG. 5A is a top view of an apparatus which structures and translates electromagnetic energy from an input optic to an output optic within a substrate, according to one illustrated implementation.
Figure 5B:
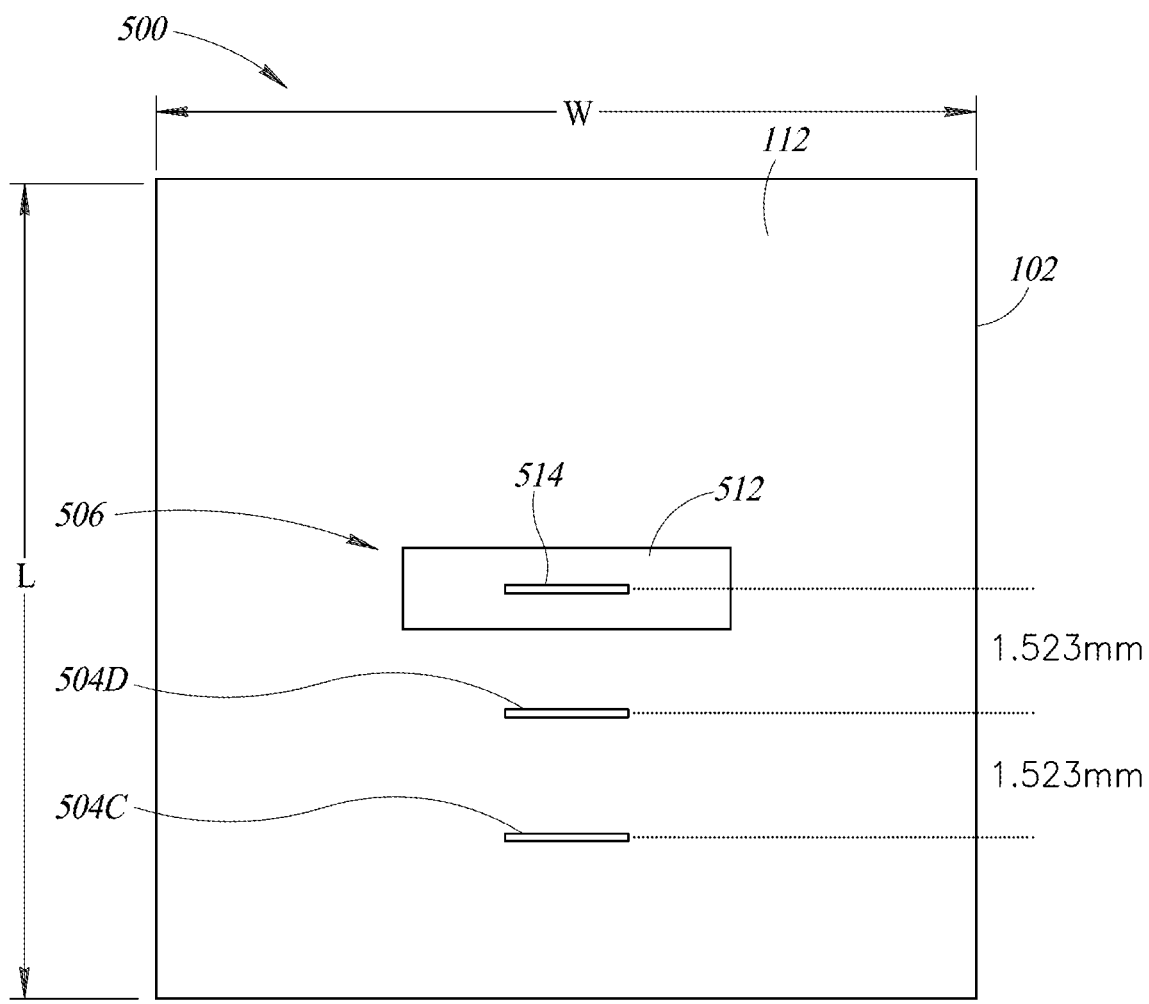
FIG. 5B is a bottom view of the apparatus of FIG. 5A, according to one illustrated implementation.

FIGS. 5A and 5B show top and bottom views, respectively, of an apparatus 500, according to one illustrated implementation. The apparatus 500 is in many respects similar to the apparatus 100 (FIG. 1A), 101 (FIGS. 1B-1D), 200 (FIG. 2A), 201 (FIG. 2B), 300 (FIGS. 3A-3B), 301 (FIG. 3C), and 400 (FIG. 4), thus similar or even identical structures or elements are identified by the same reference numbers as used in the implementations of FIGS. 1A-1D, 2A-2B, 3A-3C, and 4. In the interest of conciseness, only significant differences are discussed below.

The apparatus 500 includes a number of optical features which together structure electromagnetic energy incident upon the substrate 102 and convey the structured electromagnetic energy to a region adjacent an output optic (e.g., photonic crystal, aperture, etc.). As shown in FIG. 5A, the top major face 108 of the apparatus 500 includes an input optic 502 and two spaced apart reflectors 504A and 504B. As shown in FIG. 5B, the bottom major face 112 of the apparatus includes reflectors 504C and 504D and an output optic 506. The output optic 506 is also shown in FIG. 5A in dashed lines. The input optic 502, reflectors 504A-504D and output optic 506 are aligned so that electromagnetic energy received into the substrate 102 via the input optic is structured and conveyed laterally to the output optic 506. The region of the substrate 102 that extends past the output optic 506 along the optical path may direct electromagnetic energy to an absorber (not shown in FIG. 5A) positioned proximate the top major face 108 of the substrate 102. As another example, the region of the substrate 102 that extends past the output optic 506 along the optical path may direct electromagnetic energy to one or more additional reflectors to provide one or more additional optical paths in series.

In some implementations, the input optic 502 may comprise a region 508 (FIG. 5A) of deposited metal having an input aperture 510. In other implementations, the region 508 may comprise an absorptive layer. In some implementations, the region 508 may be rectangular in shape and may have a width of 2.0 mm and a length of 5.0 mm, and the input aperture 510 may have a width of 0.093 mm and a length of 1.500 mm, for example. The reflectors 504A and 504B on the top major face 108 may have a width of 0.032 mm and a length of 1.500 mm, for example. The reflectors 504C and 504D on the bottom major face 112 may have a width of 0.100 mm and a length of 1.500 mm, for example. The output optic 506 may comprise a region 512 of deposited metal or other reflective layer having an aperture 514. Alternatively, the region 512 may comprise an absorptive layer. In some implementations, the aperture 514 may be optically coupled to a photonic crystal or other optical component (not shown). For example, the deposited metal may be rectangular in shape and may have a width of 1.0 mm and a length of 4.0 mm, and the aperture 514 may have a width of 0.111 mm and a length of 1.510 mm.

The dimensions which are labeled on the right sides of the substrate 102 in FIGS. 5A and 5B are the center-to-center lateral separation of each of the features, according to one example. In the illustrated example, the input aperture 510 (FIG. 5A) is spaced apart from the reflector 504A by 1.523 mm, the reflector 504A is spaced apart from the reflector 504B by 1.523 mm, and the reflector 504B is spaced apart from the aperture 514 by 0.680 mm. The reflector 504C is spaced apart from the reflector 504D by 1.523 mm and the reflector 504D is spaced apart from the aperture 514 by 1.5234 mm. Such dimensions and separations are provided as non-limiting examples.

Figure 6:
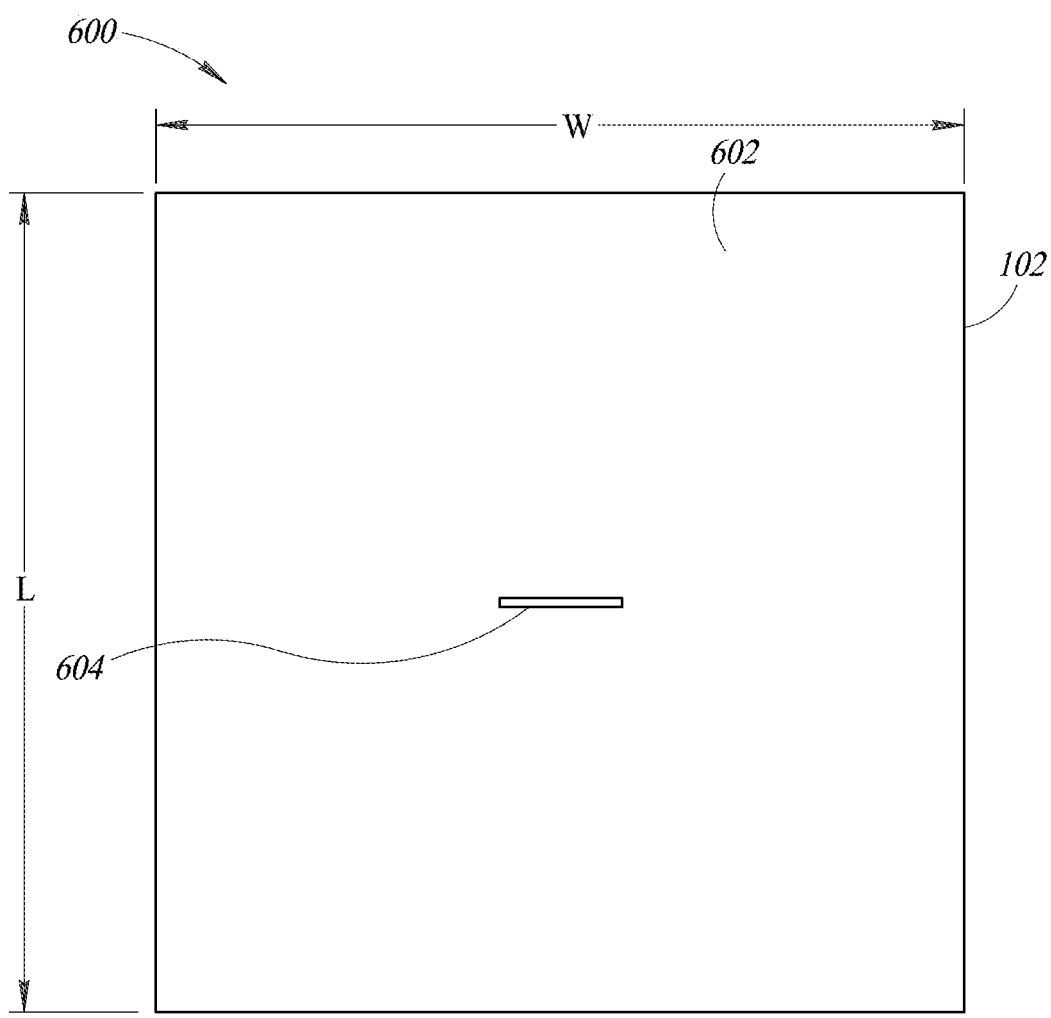
FIG. 6 is a bottom view of an alternative bottom surface reflector layout for the apparatus of FIG. 5A, according to one illustrated implementation.

FIG. 6 shows an example layout for a bottom major face 600 of a substrate 102 which may be combined with the top major face layout of the apparatus 500 shown in FIG. 5A to structure incident electromagnetic energy within the substrate 102 and convey the structured electromagnetic energy to a region proximate an output optic 604 (e.g., output aperture, etc.). In this layout, one or more reflectors 602 cover substantially the entire bottom major face 600 surrounding the output optic 604. In some implementations, the reflectors 602 are aligned with the output optic 604 which is fabricated on the bottom major face 600 of the substrate 102. A metal-free zone may surround the output optic 604. For example, the metal-free zone may be a border having a width (e.g., 5 microns) which surrounds the output optic 604.

In this example, the bottom major face 600 does not structure the angular distribution of the electromagnetic energy but instead simply conveys the electromagnetic energy to the structuring reflectors 504A and 504B positioned on the top major face 108 (FIG. 5A). The region of the reflectors 602 that extends past the output optic 604 along the optical path may direct electromagnetic energy to an absorber (not shown in FIG. 5A) positioned proximate the top major face 108 of the substrate 102. As another example, the region of the substrate 102 that extends past the output optic 604 along the optical path may direct electromagnetic energy to one or more additional reflectors to provide one or more additional optical paths in series.

Figure 7A:
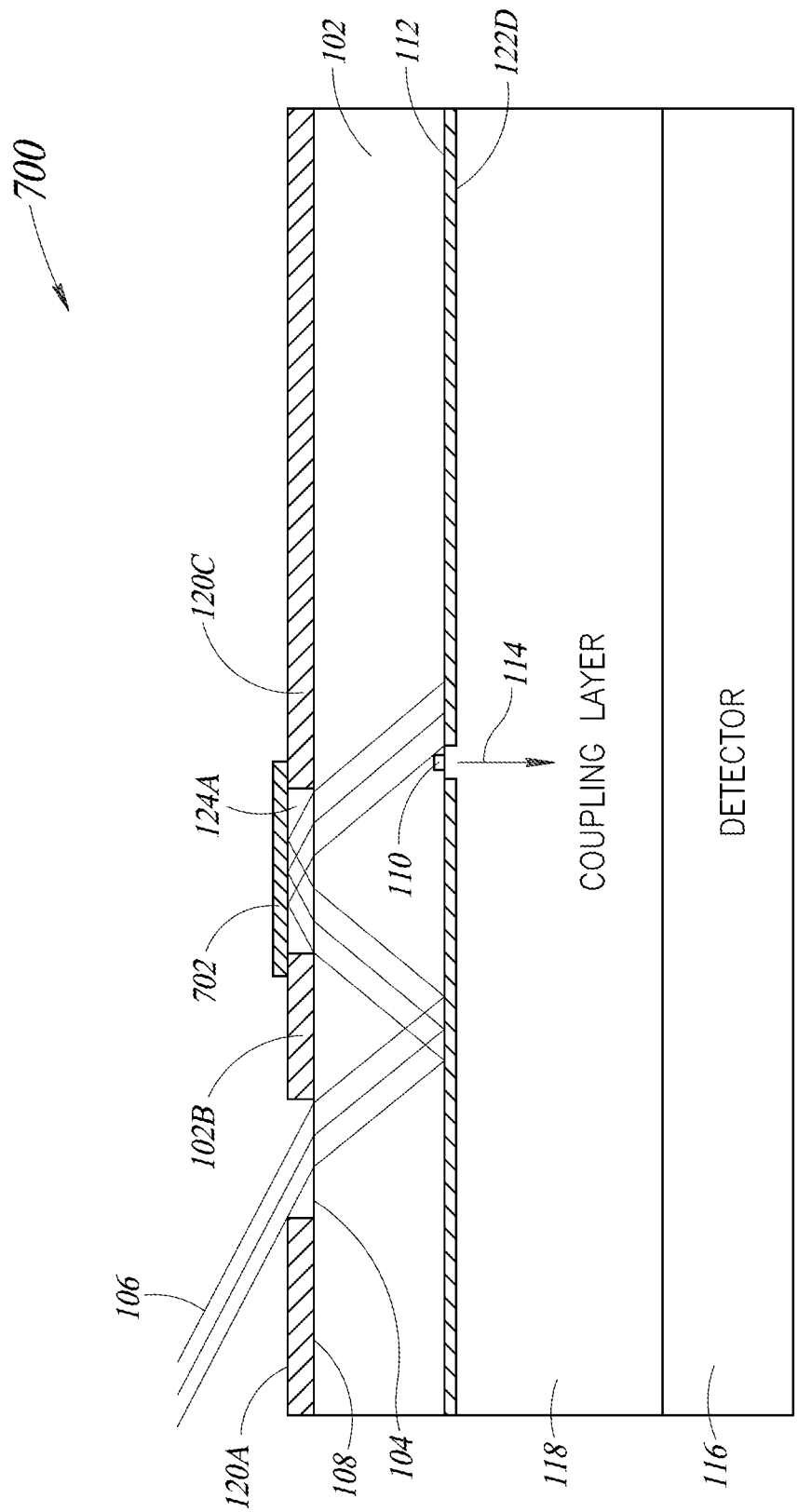
FIG. 7A is an elevational view of an apparatus which translates electromagnetic energy from an input optic to an output optic within a substrate, and which includes at least one additional optical element, according to one illustrated implementation.

FIG. 7A shows an apparatus 700, according to one illustrated implementation. The apparatus 700 is in many respects similar to the apparatus 100 (FIG. 1A), 101 (FIGS. 1B-1D), 200 (FIG. 2A), 201 (FIG. 2B), 300 (FIGS. 3A-3B), 301 (FIG. 3C), 400 (FIG. 4), and 500 (FIGS. 5A-5B, 6), thus similar or even identical structures or elements are identified by the same reference numbers as used in the implementations of FIGS. 1A-1D, 2A-2B, 3A-3C, 4, 5A-5B, and 6. In the interest of conciseness, only significant differences are discussed below.

The apparatus 700 includes an optical element 702 which receives electromagnetic energy 106 reflected from the reflector 122D proximate the bottom major face 112 of the substrate 102. The optical element 702 may include a reflector, a spectrally selective element, an absorber, a dispersive or refractive element, a diffuser, etc. Although only one optical element 702 is shown, in some implementations two or more optical elements of the same or different type may be positioned adjacent either of the top major face 108 and the bottom major face 112. The optical element 702 may be included in any of the implementations discussed herein to provide the desired optical features for electromagnetic energy to enter the substrate, propagate within the substrate and/or exit the substrate.

Figure 7B:
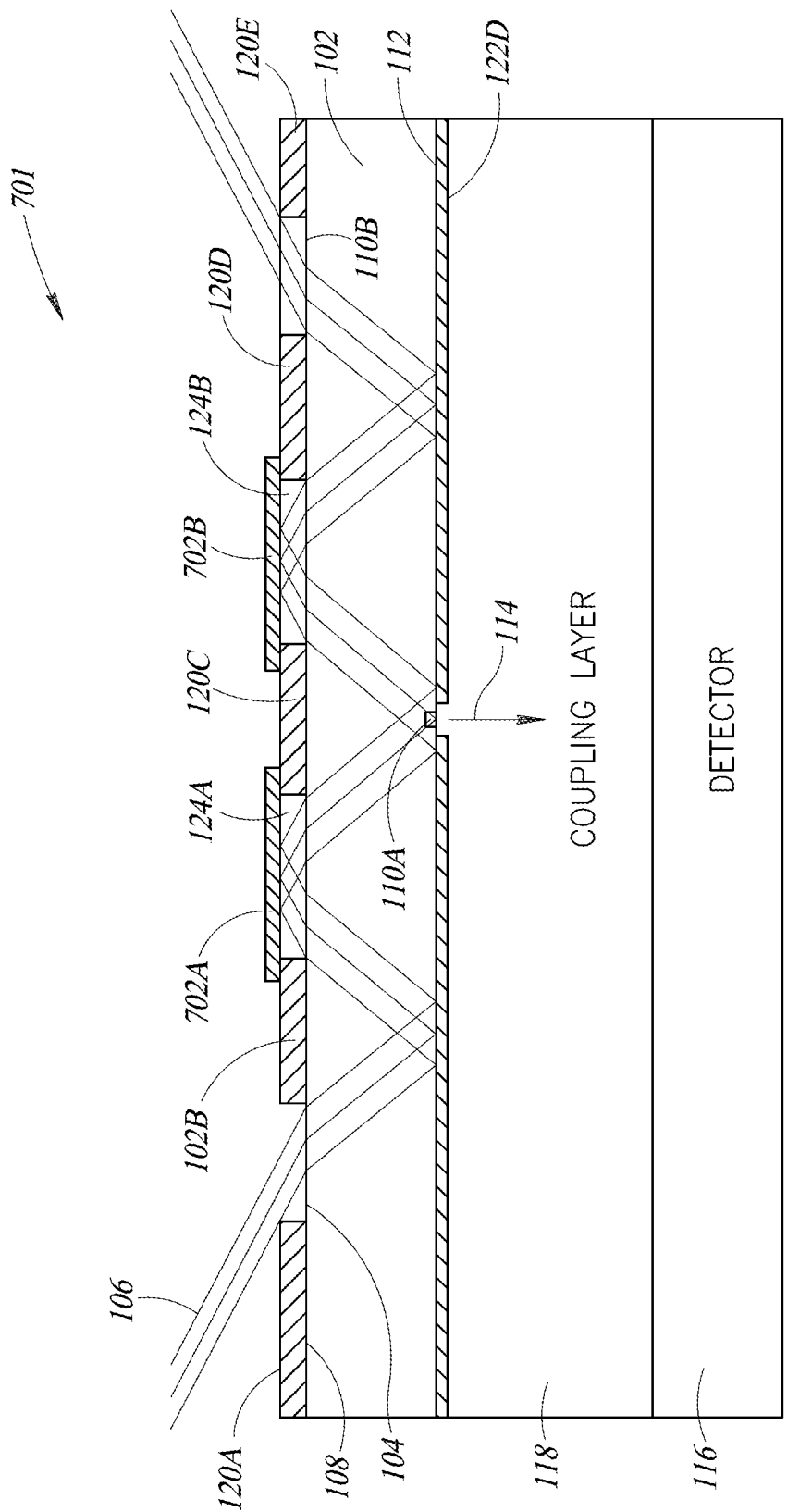
FIG. 7B is an elevational view of an apparatus which translates electromagnetic energy from an input optic to be incident on an output optic within a substrate, according to one illustrated implementation.

FIG. 7B shows an apparatus 701, according to one illustrated implementation. The apparatus 701 is in many respects similar to the apparatus 100 (FIG. 1A), 101 (FIGS. 1B 1D), 200 (FIG. 2A), 201 (FIG. 2B), 300 (FIGS. 3A-3B), 301 (FIG. 3C), 400 (FIG. 4), 500 (FIGS. 5A-5B, 6), and 700 (FIG. 7A). Thus similar or even identical structures or elements are identified by the same reference numbers as used in the implementations of FIGS. 1A-1D, 2A-2B, 3A-3C, 4, 5A-5B, 6, and 7A. In the interest of conciseness, only significant differences are discussed below.

The apparatus 701 includes an optical element 702A which receives electromagnetic energy 106 reflected from the reflector 122D proximate the bottom major face 112 of the substrate 102. The optical element 702A reflects the electromagnetic energy 106 to be incident on the output optics 110A (e.g., photonic crystal) arranged adjacent the reflector 122D. The reflector 122D reflects at least some of the electromagnetic light 106 along an optical path to exit the substrate 102 at output optic 110B (e.g., aperture). The optical elements 702A and 702B may include a reflector, a spectrally selective element, an absorber, a dispersive or refractive element, a diffuser, etc. Although only two optical elements 702 are shown, in some implementations more optical elements of the same or different type may be positioned adjacent either of the top major face 108 and the bottom major face 112. The optical element 702 may be included in any of the implementations discussed herein to provide the desired optical features for electromagnetic energy to enter the substrate, propagate within the substrate and/or exit the substrate.

Figure 8:
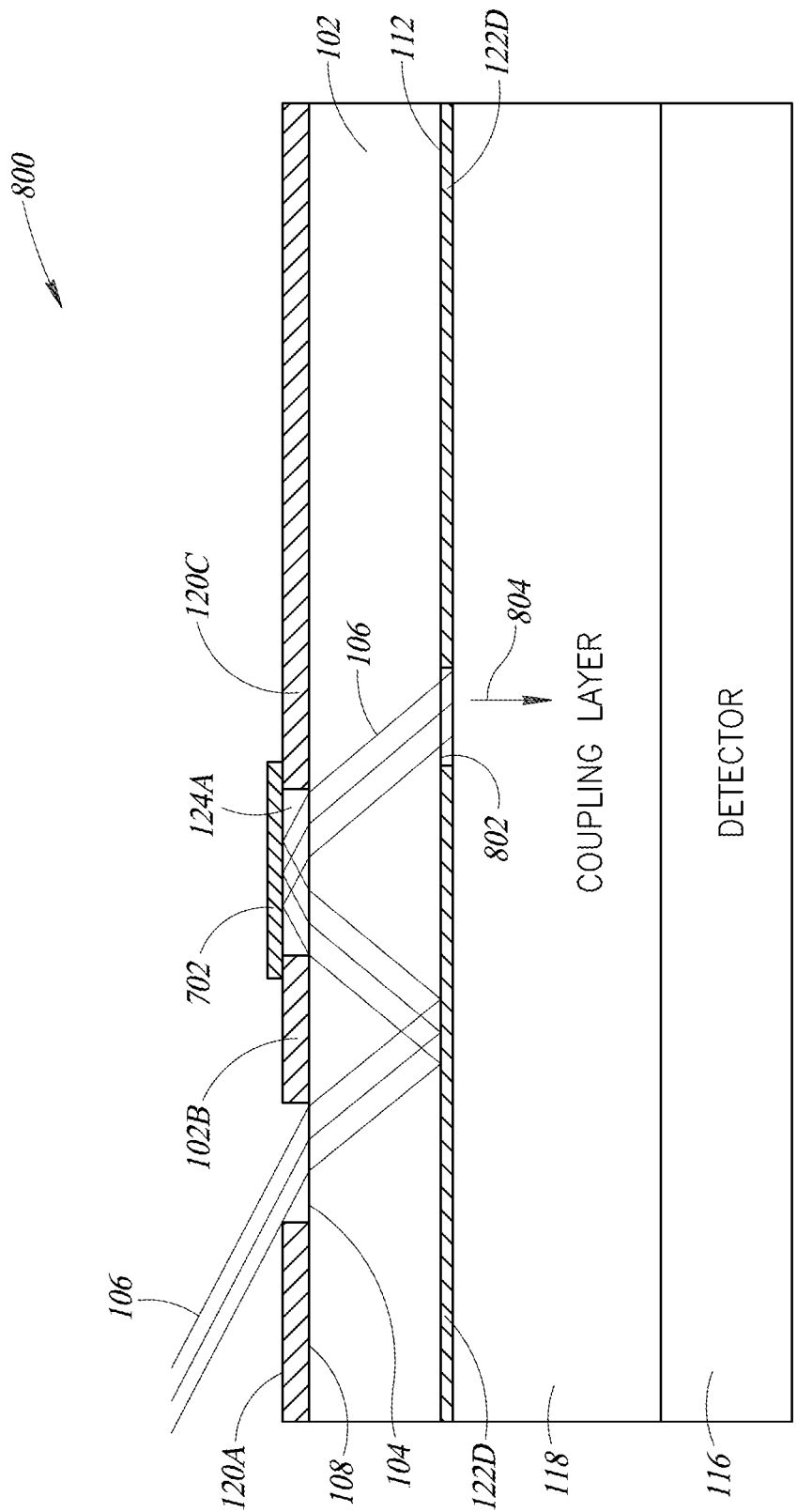
FIG. 8 is an elevational view of an apparatus which translates electromagnetic energy from an input aperture to an output aperture within a substrate, according to one illustrated implementation.

FIG. 8 shows an apparatus 800, according to one illustrated implementation. The apparatus 800 is in many respects similar to the apparatus 100 (FIG. 1A), 200 (FIG. 2A), 201 (FIG. 2B), 300 (FIGS. 3A-3B), 301 (FIG. 3C), 400 (FIG. 4), 500 (FIGS. 5A-5B, 6), and 700 (FIG. 7A), thus similar or even identical structures or elements are identified by the same reference numbers as used in the implementations of FIGS. 1A-1D, 2A-2B, 3A-3C, 4, 5A-5B, 6, and 7A-7B. In the interest of conciseness, only significant differences are discussed below.

The apparatus 800 includes an output optic 802 in the form of an output aperture which allows electromagnetic energy 106 to exit (as shown by arrow 804) the bottom major face 112 of the substrate 102. Thus, in the illustrated implementation, the input optic 104 and the output optic 802 each comprise apertures, which are transmissive regions bounded by non-transmissive regions (e.g., absorbers, reflectors).

As an example, an array of nanostructures may extract electromagnetic energy (e.g., light) in spatially defined patterns that define or deterministically relate to an incoming spectrum of electromagnetic energy passing (e.g., propagating or otherwise transmitting) through the substrate. A detector, sensor or other transducer can capture images or otherwise detect, sense or measure intensity and/or wavelength from different angles from the nanostructure(s) or across at least one dimension (e.g., length) of the detector or sensor or transducer. As discussed below with reference to FIG. 9, one or more processor-based devices may employ the image information to determine the radiation spectrum of the incident electromagnetic energy, including the presence and/or intensity of one or more specific ranges of wavelengths (e.g., for detection of a particular atomic or molecular emission line).

Various nanostructures may be formed (e.g., patterned into the substrate or another layer) using various nanofabrication technologies.

A nanostructure array or lattice (e.g., photonic crystal, plasmonic nanostructure array or lattice, diffraction grating nanostructures array of lattice) may comprise and/or be formed in a dielectric material. The nanostructure array or lattice can be located on an exterior surface or boundary of the substrate. The nanostructure array or lattice can comprise a first surface including first array of periodic features on or in the dielectric material. The array can extend in at least two dimensions (e.g., along a length and width, optional along a depth or thickness), and can have an effective dielectric permittivity that is different from a dielectric permittivity of the surrounding dielectric material. The periodic features have a defined or specified lattice constant, which may include a gradient of lattice constants, and the portion of the electromagnetic energy which the periodic features extract from the substrate is a function in part of the defined specified lattice constant(s). In some implementations, rather than a continuum, a series of sections with different lattice constants may be utilized.

In an example, one or more of optical features discussed herein may be formed, imprinted, or otherwise patterned on a substrate itself, or the features can be separately fabricated, for instance in a distinct layer, and mechanically and optically coupled to a major face of the substrate. In an example, one or more optical features can be formed via imprint, electron-beam lithography or using another patterning technique (e.g., a photonic patterning technique such as two-photon lithography, projection lithography, among others).

For example, a two-dimensional array pattern of periodic nanostructure features can be formed, such as in a transparent medium on or in a transparent substrate. In an example, the two-dimensional array pattern of periodic nanostructure features can be used to selectively in-couple incident electromagnetic energy (e.g., optical electromagnetic energy or light) and/or out-couple specific wavelengths or ranges of wavelength (e.g., ultraviolet, visible, or infrared light, among others) of electromagnetic energy (e.g., optical electromagnetic energy or light). The incident electromagnetic energy can be transmitted or propagated through the substrate when provided to a major face of the substrate via an input optic (e.g., focused on or coupled to at least a portion of the major face of the substrate). Similarly, in an example, a three-dimensional array pattern of periodic nanostructure features can be formed, such as by laminating or bonding a series of separately-fabricated two-dimensional arrays, among other techniques formed on distinct layers.

As discussed further below with reference to FIG. 9, the article or an apparatus employing the article may include an illumination source, for instance standard LEDs, which emit in a range of wavelengths (e.g., white light emitting LEDs). The nanostructures may be responsive to relatively narrow ranges of wavelengths (e.g., red, blue, ultraviolet), or may be responsive to relatively broad ranges of wavelengths (e.g., all visible wavelengths, all optical wavelengths, i.e., visible, at least near-infrared, at least near-ultraviolet).

Figure 9:
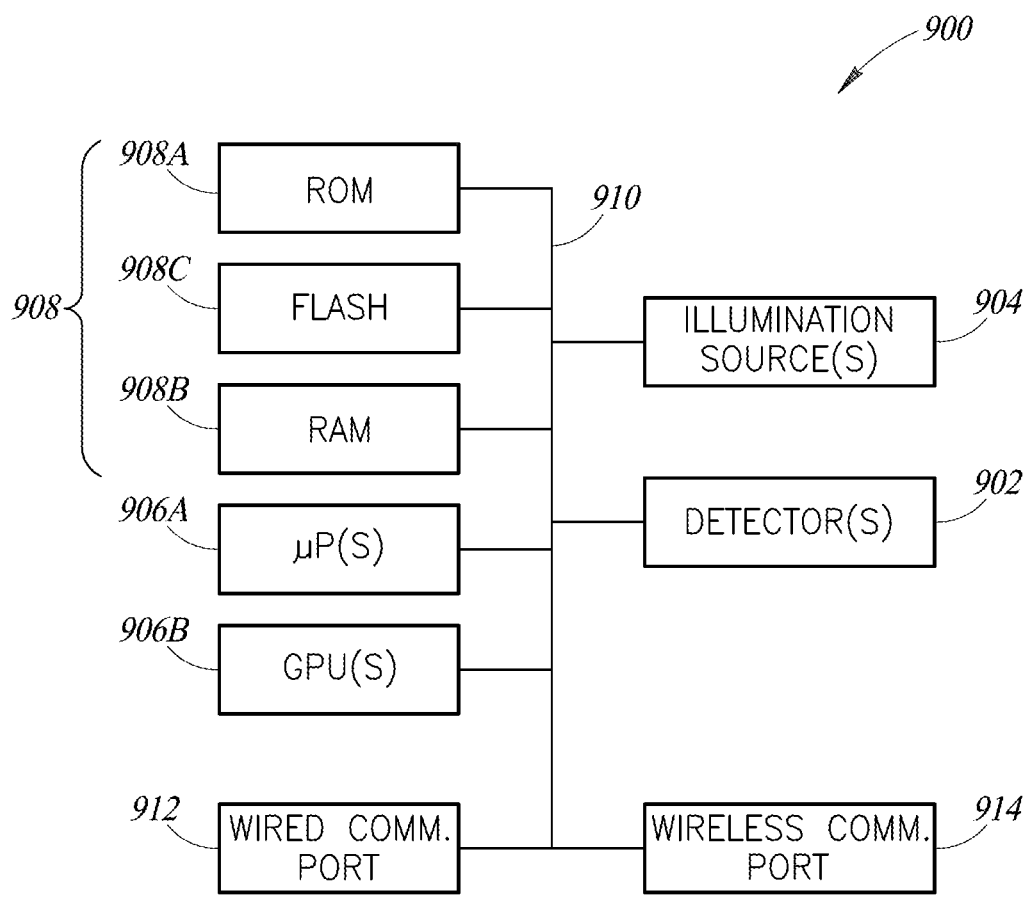
FIG. 9 is a schematic diagram of a system that includes any of the apparatus and/or structures or components described in reference to FIGS. 1-8, according to one illustrated implementation.

FIG. 9 shows a system 900, according to at least one illustrated implementation. The system 900 may include the apparatus and/or structures or components of any of the implementations discussed in reference to FIGS. 1A-1D, 2A-2B, 3A-3C, 4, 5A-5B, 6, 7A-7B, and 8.

The system 900 may include a processor-based system, for instance a computer, which is communicatively coupled to one or more detectors 902, for instance the detectors of the various apparatus discussed above.

The computing system 900 may be integrated into the housing of the apparatus, or may be distinctly separate therefrom, and may even be remotely located from the apparatus and detector(s) 902. The computing system 900 is suitable for receiving information from the detector(s) 902 which indicates information about electromagnetic energy (e.g., light) received by the detector(s) 902. While not illustrated, there may be one or more intermediary components (e.g., analog-to-digital converters or ADCs) between computing system 900 and the detector(s) 902, for example to change raw signals from the detector(s) 902 into a format suitable for the computing system 900. The computing system 900 is also suitable for analyzing the information from the detector(s) 902. The computing system 900 may also be communicatively coupled to control one or more illumination sources 904, which may illuminate a specimen or sample with electromagnetic energy, which is then provided to the interior of the housing as described above. The article or an apparatus employing the article may include one or more illumination sources, for instance one or more light emitting diodes (LEDs), which can take the form of standard LEDs or organic LEDs, and which an emit in a range of wavelengths (e.g., white light emitting LEDs, IR emitting LEDs, blue emitting LEDs).

The apparatus with the computing system 900 may form an analytical instrument, for example a spectrometer. The apparatus may have a relatively small form factor and weight, and in some instances be powered via one or more battery cells, and thus may be portable or even handheld.

The computing system 900 may include one or more processing units 906A and 906B (collectively processing unit 906), system memory 908 and a system bus 910 that couples various system components including the system memory 908 to the processing units 906. The processing unit 906 may be any logic processing unit, such as one or more central processing units (CPUs) 906A (e.g., ARM Cortext-A8, ARM Cortext-A9, Snapdragon 600, Snapdragon 800, NVidia Tegra 4, NVidia Tegra 4i, Intel Atom Z2580, Samsung Exynos 5 Octa, Apple A7, Apple A8, Motorola X8), graphical processing units (GPUs) 906B, digital signal processors (DSP), application-specific integrated circuits (ASICs), field programmable gate arrays (FPGAs), etc. The system bus 910 can employ any known bus structures or architectures, including a memory bus with memory controller, a peripheral bus, and a local bus. The system memory 908 includes read-only memory (ROM) 908A, random access memory (RAM) 908B, and flash memory 908C. A basic input/output system (BIOS) can be stored in the ROM 908A, and contains basic routines that help transfer information between elements within the computing system 900, such as during start-up. Computer-readable storage media can be used to store the information that may be accessed by processing unit 906A. For example, such computer-readable storage media may include, but is not limited to, random access memory (RAM), read-only memory (ROM), electrically erasable programmable read-only memory (EEPROM), flash memory, or other solid state memory or any other medium.

The computing system 900 also may include a plurality of interfaces such as wired network interface or port 912 and wireless network interface or port 914 supporting any other wireless/wired protocols. The wireless network interface or port 914 may include one or more radios (not shown) and associated antennas (not shown). The transceivers or radios can take the form of any device capable of transmitting and receiving communications via electromagnetic energy. For example, the computing system 900 may include one or more cellular transceivers or radios, one or more WI-FI® transceivers or radios, and one or more BLUETOOTH® transceivers or radios, along with respective associated antennas. Accordingly, the computing system 900 may be a smart phone or tablet computer that is capable of communicating via cellular, WI-FI®, and BLUETOOTH® and communications.

Non-limiting examples of cellular communications transceivers or radios include a CDMA transceiver, a GSM transceiver, a 3G transceiver, a 4G transceiver, an LTE transceiver, and any similar current or future developed mobile device transceiver having at least one of a voice telephony capability or a graphical data exchange capability. In at least some instances, the cellular transceivers or radios can include more than one interface. For example, in some instances, the cellular transceivers or radios can include at least one dedicated, full- or half-duplex voice call interface and at least one dedicated data interface. In other instances, the cellular transceivers or radios can include at least one integrated interface capable of contemporaneously accommodating both full- or half-duplex voice calls and data transfer.

Non-limiting examples of WI-FT® transceivers or radios include various chipsets available from Broadcom, including BCM43142, BCM4313, BCM94312MC, BCM4312, and WI-FI® chipsets available from Atmel, Marvell, or Redpine. Non-limiting examples of WI-FI® transceivers or radios include various chipsets available from Broadcom, Tex. Instruments and Redpine.

Program modules can be stored in the system memory 908, such as an operating system (e.g., Linux®, iOS®, Android °, Windows® Phone, Windows® 8, and similar), one or more application programs, other programs or modules, and program data. Application programs may include instructions that cause the processor unit(s) 906 to generate, process, and/or receive information from the detector(s) 902, either in raw or preprocessed form, and to analyze the information, for example determining an intensity of light detected at each of a plurality of wavelengths. More particularly, the application programs include instructions that cause the processor unit(s) 906 to perform one or more of the acts described herein.

Other program modules may include instructions for handling security such as password or other access protection and communications encryption. The system memory 908 may also include communications programs, for example, a Web client or browser for permitting the computing system 900 to access and exchange data with sources such as Web sites of the Internet, corporate intranets, extranets, or other networks and devices as described herein, as well as other server applications on server computing systems. The browser may be a markup language based browser, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

An operator can enter commands and information into the computing system 900 through input devices such as a touch screen (not shown), and/or via a graphical user interface. Other input devices can include a microphone, a pointing device, etc. These and other input devices, such as camera unit, are connected to one or more of the processing units 906 through the bus 910 or the interface or port 912, 914 such as a serial port interface or universal serial bus (USB) port that is coupled to the system bus 910, although other interfaces such as a parallel port, a game port or a wireless interface can be used. The touch screen device or other display device is coupled to the system bus 910 via a video interface (not shown), such as a video adapter.

The computing system 900 can operate in a networked environment using logical connections to one or more remote computers and/or devices. For example, the computing system 900 can operate in a networked environment using logical connections to one or more cellular networks, mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including U.S. Provisional Patent Application Ser. No. 62/334,050, filed May 10, 2016; U.S. Provisional Patent Application Ser. No. 62/234,315, filed Sep. 29, 2015, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An apparatus, comprising:
a substrate that is transmissive of electromagnetic energy of at least a plurality of wavelengths, the substrate having a first end, a second end, a first major face, a second major face, at least one edge, a length, a width, and a thickness, the second end opposed to the first end across the length of the substrate, the second major face opposed across the thickness of the substrate from the first major face, the at least one edge which extends between at least a portion of the first major face and a portion of the second major face, the width of the substrate greater than the thickness of the substrate;
at least a first input optic oriented and positioned to provide electromagnetic energy into the substrate via at least one of the first or the second major face of the substrate without total internal reflection therein;
at least a first output optic spaced along at least one of the length or the width of the substrate from the first input optic;
a number of first reflective portions that extend at least partially along the first major face of the substrate, the first number of first reflective portions including at least two first reflective portions, the number of first reflective portions oriented and positioned to control a propagation direction of electromagnetic energy along a folded optical path, at least a portion of which extends through the substrate between the first input optic and the first output optic when electromagnetic energy is incident on the first input optic;
a number of second reflective portions that extend at least partially along the second major face of the substrate, the first number of second reflective portions including at least two second reflective portions, the number of second reflective portions oriented and positioned to control the propagation direction of electromagnetic energy along the folded optical path when electromagnetic energy is incident on the first input optic;
a number of non-reflective absorptive portions that extend at least partially along the first major face of the substrate, at least one of the number of non-reflective absorptive portions positioned laterally adjacent to at least a portion of at least one of the number of first reflective portions, where for each pair of successive ones of the at least two first reflective portions along the first major face of the substrate there is at least one of the non-reflective absorptive portions positioned between the first reflective portions that constitute the respective pair of the at least two first reflective portions; and
a number of non-reflective absorptive portions that extend at least partially along the second major face of the substrate, at least one of the number of non-reflective absorptive portions positioned laterally adjacent to at least a portion of at least one of the number of second reflective portions, where for each pair of successive ones of the at least two second reflective portions along the second major face of the substrate there is at least one of the non-reflective absorptive portions positioned between the second reflective portions that constitute the respective pair of the at least two second reflective portions,
wherein a spatial extent of at least one of the number of first reflective portions or the number of second reflective portions spatially limits the electromagnetic energy along the folded optical path, and the first reflective portions and second reflective portions limits a range of propagation angles of the electromagnetic energy along the folded optical path.

2. The apparatus of claim 1 wherein at least one of the number of first reflective portions and the number of second reflective portions comprises a metal layer and the substrate is formed of fused silica.

3. The apparatus of claim 1 wherein the first output optic selectively extracts electromagnetic energy of a first set of wavelengths from at least one of the first or the second major face of the substrate.

4. The apparatus of claim 3 wherein the first output optic comprises a photonic crystal, and the photonic crystal comprises a one-dimensional, two-dimensional, or a three-dimensional photonic crystal.

5. The apparatus of claim 1 wherein the first output optic is positioned in or comprises a gap in a reflective material.

6. The apparatus of claim 1 wherein the first output optic is positioned in or comprises a gap in an absorptive material.

7. The apparatus of claim 1 wherein the first input optic comprises an input aperture bordered by a reflective material.

8. The apparatus of claim 1 wherein the first input optic comprises an input aperture bordered by an absorptive material.

9. The apparatus of claim 1, further comprising:
at least a second output optic spaced along at least one of the length or the width of the substrate from the first input optic and the first output optic.

10. The apparatus of claim 9 wherein the second output optic is spaced laterally between the first input optic and the first output optic.

11. The apparatus of claim 1 wherein the first output optic comprises one of a first photonic crystal lattice or a first plasmonic structure.

12. The apparatus of claim 1 wherein the first major face of the substrate is parallel to the second major face of the substrate.

13. The apparatus of claim 1 wherein the first input optic is selected from the group consisting of a focusing lens, an array of focusing lenses, a prism, an array of prisms, a mirror, an array of mirrors, a reflector, a reflective surface, a reflective boundary, an absorptive boundary, a refractive boundary, an input aperture, and a nanostructure.

14. The apparatus of claim 1 wherein the first output optic is selected from the group consisting of a focusing lens, an array of focusing lenses, a prism, an array of prisms, a mirror, an array of mirrors, a reflector, a reflective surface, a reflective boundary, a refractive boundary, an output aperture, and a nanostructure.

15. The apparatus of claim 1 wherein the first input optic and the first output optic are each on respective ones of the first or the second major face of the substrate.

16. The apparatus of claim 1, further comprising:
a sensor responsive to one or more of the plurality of wavelengths of electromagnetic energy, the sensor positioned to receive electromagnetic energy which exits the substrate at least via the first output optic.

17. The apparatus of claim 16 wherein the first input optic is coupled to input light to the substrate via the first major face of the substrate and the sensor is a light sensor positioned to receive light which exits the substrate via the second major face of the substrate.

18. The apparatus of claim 16 wherein the first input optic inputs light to the substrate via the first major face of the substrate and the sensor is a light sensor positioned to receive light which exits the substrate via the first major face of the substrate.

19. The apparatus of claim 1, further comprising:
a plurality of input optics each oriented and positioned to provide electromagnetic energy into the substrate via at least one of the first or the second major face of the substrate without total internal reflection therein.

20. The apparatus of claim 1, further comprising:
a plurality of output optics spaced along at least one of the length and the width of the substrate, each of the plurality of output optics outputs electromagnetic energy from at least one of the first or the second major face of the substrate.

21. The apparatus of claim 1, further comprising:
a spectrally selective element disposed within or on the substrate.

22. The apparatus of claim 21 wherein the spectrally selective element comprises at least one of: a photonic crystal element; a diffractive element, a refractive element, a prismatic element, a scattering element, or a filter element.

23. The apparatus of claim 21 wherein the spectrally selective element is disposed within or on the substrate laterally between the first input optic and the first output optic.

24. The apparatus of claim 1, further comprising:
an optical element disposed at least proximate the first major face or the second major face of the substrate along the folded optical path, the optical element comprising at least one of: a photonic crystal element, a reflection grating, a transmission grating, a dispersive element, a refractive element, a filter, a lens, a light source, or a diffuser.

25. The apparatus of claim 1 wherein each of the number of non-reflective absorptive portions comprises an absorber that absorbs stray light.

26. The apparatus of claim 1 wherein at least one of the number of non-reflective absorptive portions comprises at least one of paint, paper, coating or a film.

27. A method of fabricating an apparatus, the method comprising:
providing a substrate that is transmissive of electromagnetic energy of at least a plurality of wavelengths, the substrate having a first end, a second end, a first major face, a second major face, at least one edge, a length, a width, and a thickness, the second end opposed to the first end across the length of the substrate, the second major face opposed across the thickness of the substrate from the first major face, the at least one edge which extends between at least a portion of the first major face and a portion of the second major face, the width of the substrate greater than the thickness of the substrate;
orienting and positioning at least a first input optic to provide electromagnetic energy into the substrate via at least one of the first or the second major face of the substrate;
orienting and positioning at least a first output optic laterally spaced from the first input optic, the first output optic outputs electromagnetic energy from the substrate;
orienting and positioning a number of first reflective portions at least partially along the first major face of the substrate, the number of first reflective portions oriented and positioned to control a propagation direction of electromagnetic energy along a folded optical path, at least a portion of which extends through the substrate between the first input optic and the first output optic when electromagnetic energy is incident on the first input optic;

orienting and positioning a number of second reflective portions at least partially along the second major face of the substrate, the number of second reflective portions oriented and positioned to control the propagation direction of electromagnetic energy along the folded optical path when electromagnetic energy is incident on the first input optic, orienting and positioning a number of non-reflective absorptive portions that extend at least partially along the first major face of the substrate with at least one of the number of non-reflective absorptive portions positioned laterally adjacent to at least a portion of each of two of the number of first reflective portions, where for each pair of successive ones of the at least two first reflective portions along the first major face of the substrate there is at least one of the non-reflective absorptive portions positioned between the first reflective portions that constitute the respective pair of the at least two first reflective portions; and orienting and positioning a number of non-reflective absorptive portions that extend at least partially along the second major face of the substrate with at least one of the number of non-reflective absorptive portions positioned laterally adjacent to at least a portion of each of two of the number of first reflective portions, where for each pair of successive ones of the at least two second reflective portions along the second major face of the substrate there is at least one of the non-reflective absorptive portions positioned between the second reflective portions that constitute the respective pair of the at least two second reflective portions, at least one of the number of first reflective portions or second reflective portions limits a range of propagation angles of the electromagnetic energy along the folded optical path, wherein a spatial extent of at least one of the number of first reflective portions or the number of second reflective portions spatially limits the electromagnetic energy along the folded optical path.

28. An apparatus, comprising:

a substrate that is transmissive of electromagnetic energy of at least a plurality of wavelengths, the substrate having a first end, a second end, a first major face, a second major face, at least one edge, a length, a width, and a thickness, the second end opposed to the first end across the length of the substrate, the second major face opposed across the thickness of the substrate from the first major face, the at least one edge which extends between at least a portion of the first major face and a portion of the second major face, the width of the substrate greater than the thickness of the substrate;

at least a first input optic oriented and positioned to provide electromagnetic energy into the substrate via at least one of the first or the second major face of the substrate without total internal reflection therein;

at least a first output optic spaced along at least one of the length or the width of the substrate from the first input optic;

a number of first reflective portions that extend at least partially along the first major face of the substrate, the number of first reflective portions oriented and positioned to control a propagation direction of electromagnetic energy along a folded optical path, at least a portion of which extends through the substrate between the first input optic and the first output optic when electromagnetic energy is incident on the first input optic; and a number of second reflective portions that extend at least partially along the second major face of the substrate, the number of second reflective portions oriented and positioned to control the propagation direction of electromagnetic energy along the folded optical path when electromagnetic energy is incident on the first input optic;

a number of absorptive portions that extend at least partially along at least one of the first major face or the second major face of the substrate, at least one of the number of absorptive portion positioned laterally adjacent to at least a portion of at least one of the number of first reflective portions or the number of second reflective portions, wherein a spatial extent of at least one of the number of first reflective portions or the number of second reflective portions spatially limits the electromagnetic energy along the folded optical path, and the first reflective portions and second reflective portions limits a range of propagation angles of the electromagnetic energy along the folded optical path.

29. The apparatus of claim 1 wherein the non-reflective portions are absorbers that absorb stray wavelengths of electromagnetic energy, each of the first reflective portions along the first major face of the substrate is bordered by one or more of the non-reflective portions, and each of the second reflective portions along the second major face of the substrate is bordered by one or more of the non-reflective portions.

30. The apparatus of claim 28 wherein each of the first reflective portions along the first major face of the substrate is bordered by one or more of the absorptive portions, and each of the second reflective portions along the second major face of the substrate is bordered by one or more of the absorptive portions.

* * * * *

UNITED STATES PATENT AND TRADEMARK OFFICE
CERTIFICATE OF CORRECTION

| | | |
|---|---|---|
| PATENT NO. | : 10,859,437 B2 | Page 1 of 1 |
| APPLICATION NO. | : 16/303373 | |
| DATED | : December 8, 2020 | |
| INVENTOR(S) | : James Scholtz et al. | |

It is certified that error appears in the above-identified patent and that said Letters Patent is hereby corrected as shown below:

In the Claims

Column 27, Line 46, Claim 13:
"boundary, an input aperture, and a nanostnicture"
Should read:
--boundary, an input aperture, and a nanostructure--.

Column 28, Line 21, Claim 22:
"crystal element; a diffractive element, a refractive element,"
Should read:
--crystal element, a diffractive element, a refractive element,--.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*